(12) United States Patent
Plestid et al.

(10) Patent No.: US 7,623,882 B2
(45) Date of Patent: Nov. 24, 2009

(54) SYSTEM AND METHOD FOR QUEUEING AND MODERATING GROUP TALK

(75) Inventors: Trevor Plestid, Ottawa (CA); Luis Pablo Estable, Hull (CA)

(73) Assignee: Research In Motion Limited, Waterloo, Ontario (CA)

( * ) Notice: Subject to any disclaimer, the term of this patent is extended or adjusted under 35 U.S.C. 154(b) by 838 days.

(21) Appl. No.: 10/941,985

(22) Filed: Sep. 16, 2004

(65) Prior Publication Data

US 2006/0058052 A1    Mar. 16, 2006

(51) Int. Cl.
     *H04B 7/00* (2006.01)
(52) U.S. Cl. .................... 455/519; 455/90.2; 455/518
(58) Field of Classification Search ......... 455/517–521, 455/90.2
See application file for complete search history.

(56) References Cited

U.S. PATENT DOCUMENTS

| | | | |
|---|---|---|---|
| 5,054,109 A | 10/1991 | Blackburn | 455/17 |
| 5,457,735 A | 10/1995 | Erickson | 379/58 |
| 5,537,684 A | 7/1996 | Cassidy et al. | 455/34.1 |
| 6,151,514 A | 11/2000 | Cheng et al. | 455/564 |
| 2002/0077136 A1 | 6/2002 | Maggenti et al. | |
| 2002/0177460 A1* | 11/2002 | Beasley et al. | 455/502 |
| 2003/0078064 A1* | 4/2003 | Chan | 455/514 |
| 2005/1003253 * | 2/2005 | Noel et al. | 455/518 |

FOREIGN PATENT DOCUMENTS

| | | |
|---|---|---|
| CA | 2464114 | 5/2003 |
| JP | 698029 | 4/1994 |
| JP | 06098029 | 4/1994 |
| WO | 0040045 A1 | 7/2000 |
| WO | 0167674 A2 | 9/2001 |
| WO | 03036801 A2 | 5/2003 |
| WO | WO 03/036801 A2 | 5/2003 |
| WO | WO 2005/057890 A2 | 6/2005 |

OTHER PUBLICATIONS

Motorola Inc., "MT 2000 Synthesized FM Portable Radio", XP007901865, 1996-00-00, retrieved on Mar. 16, 2007 from http://www.motorola.com/governmentandenterprise/contentdir/en_US/NonXMLDocs/R3-4-150C_MT2000_catsheet.pdf.
Japanese Office Action for Application No. 2006-551699, Dated Jun. 21, 2009.

* cited by examiner

*Primary Examiner*—Raymond S Dean
(74) *Attorney, Agent, or Firm*—John J. Oskorep, Esq.

(57) ABSTRACT

Systems of methods for performing queued and moderated talk groups in a system featuring network provided half duplex communications talk group sessions. For queuing, rather than dropping a talk request from a user which is listening, the request is forwarded to the network and maintained in a list which is the used to grant access to the talk channel. For moderated talk groups, a wireless device is designated to be a moderator network device. The requests for the talk channel are then forwarded to the moderator network device. The moderator network device is equipped with functionality allowing a user of the device to select the order in which devices are granted the talk channel. In other implementations, meta-groups are provided, and rules of order for talk group sessions are implemented.

29 Claims, 13 Drawing Sheets

SYSTEM AND METHOD FOR QUEUEING AND MODERATING GROUP TALK

FIELD OF THE APPLICATION

This application relates to wireless communications systems and more particularly to group talk in wireless communications systems providing half-duplex voice communications services.

BACKGROUND OF THE APPLICATION

Communication systems are available which provide walkie-talkie-like functionality or similar half-duplex voice functionality which may take the form of PTT™ (Push-To-Talk™) over a dispatch service, PTT™ over cellular (PoC) services (part of the OMA standard), or otherwise. When referred to herein, walkie-talkie-like functionality and half-duplex voice functionality are to be taken generally to mean any voice communication functionality delivered via a network or networks which at any one time is capable of transmitting voice communication from a talking or transmitting party's device to a listening or receiving party's device, but does not simultaneously transmit voice communication from the receiving party's device to the talking party's device, while the talking party's device is transmitting voice to the receiving party's device. It is noted that such devices typically do not exclude other means of data communications, such as Instant Messaging (chat) over wireless, which in fact are defined as part of the OMA spec to be allowed during a PoC session. During an active PTT™ session or dispatch call session, only one user device (the "talker's" device) participating in the session may be designated as the transmitting or talking device at any one time. A user device gains the role of transmitting device by requesting the talk/transmit channel from the network and by being granted the talk/transmit channel by the network. While a talker's device is in possession of the transmit channel (during a talk period), all of the other devices (listeners' devices) in the active dispatch call session are in listener mode and cannot transmit voice until the transmitting device requests the network to terminate the talk period and release the talk/transmit channel. Times during which the talk/transmit channel is not occupied are idle periods. In standard implementations of PTT™, the user interface of, for example, a wireless device, includes a PTT™ button to allow the user to control the sending of requests to acquire and release the talk/transmit channel, these requests being sent over a logical control channel to the network.

An example of a system providing PTT™ functionality as part of its walkie-talkie-like services is the iDEN™ system of Motorola™. Other example systems which can provide such PTT™ services are 1×RTT CDMA, UMTS, GSM/GPRS, TDMA, and the 802.11 family of standards. Push-To-Talk™ service may be provided as an optional half-duplex service over existing network systems which also provide for full duplex communication, or may be provided as a service over network systems which provide only half-duplex communication.

SUMMARY

According to one broad aspect, the application provides a network adapted to deliver walkie-talkie-like communications capabilities within a talk group of wireless devices such that within the group, a single wireless device is given transmit capability while all other devices have a receive capability, the network comprising a talk order controller being adapted to perform talk order control by: receiving requests via the network for the transmit capability and maintain a record of the requests that are outstanding; granting requests for the transmit capability based on the record of the requests which are outstanding.

In some embodiments, the record of the requests that are outstanding comprises a list of requests that are outstanding arranged in an order they were received, and wherein the requests for transmit capability are granted from oldest to newest.

In some embodiments, the network is adapted to detect or receive an indication that the transmit capability has been given up, and responsive to the transmit capability having been given up transmit a clear to talk message to a device next to be granted the transmit capability.

In some embodiments, the network is further adapted to receive a request from a device to request that the device no longer be considered waiting for the transmit capability.

In some embodiments, messages are transmitted associated with the talk group, the messages comprising at least one of: release of talk message from device to network; clear to talk message from network to device; interrupt message from network to device; mute order from network to wireless device.

In some embodiments, the network is further adapted to count a number of requests received from each device and re-prioritize granting the transmit privilege on the basis of the number of requests received from each device.

In some embodiments, the network in combination with the plurality of groups of wireless devices.

In some embodiments, the network forming part of and in combination with one of the devices in the group of devices.

In some embodiments, at least one of the network and a device of the group of devices is adapted to perform moderation for the group of devices, and is designated to be a moderator device for the group.

In some embodiments, the network is adapted to, for each group: maintain a designation of the particular device to be moderator device for the group; receive requests for the transmit capability and forward the requests to the moderator device; receive from the moderator device grants of the transmit capability and forward each grant at least to a respective grantee device.

In some embodiments, the network is further adapted to: maintain privilege information for each of the talk group of devices; receive talk group control messages from the wireless devices and process the messages in accordance with the privilege information.

In some embodiments, the privilege information comprises an indication of whether at least one of the following privileges is accorded a given wireless device: moderator capability; moderator meta-group capability; private messaging within group; broadcast messaging; talk channel request access; listen-only access.

In some embodiments, the moderator device is adapted to receive via the network requests from other devices for the transmit capability; the moderator device has a user interface for receiving a user selection of a device from which a request for transmit capability has been received to be selected and granted the transmit capability; responsive to said user selection the moderator device being adapted to transmit a message granting the transmit capability to the device via the network.

In some embodiments, the network is adapted to: maintain a set of rules of order for the talk group; allow interaction between the talk group in accordance with the rules of order.

In some embodiments, the rules of order comprise: rights to make motions; order of precedence of motion; rules respecting motions.

In some embodiments, the network is implemented using one of CDMA-based communications, 802.11-based communications, iDEN, GPRS, Bluetooth, UMTS, PoC (push to talk over cellular).

In some embodiments, the messages are transmitted using DTMF signals.

According to another broad aspect, the application provides a method comprising, in sequence: setting up a network delivered walkie-talkie-like communications session between a plurality of wireless devices; granting a transmit capability to one of the wireless devices and a listen privilege to remaining wireless devices; receiving requests for the transmit capability from wireless devices having the listen privilege; granting the transmit capability in response to the requests for the transmit capability.

In some embodiments, granting the transmit capability in response to the requests for the transmit capability is done in the order the requests are received.

In some embodiments, granting the transmit capability in response to the requests for the transmit capability is done under control of a moderator.

In some embodiments, granting the transmit capability in response to the requests for the transmit capability is done in accordance with a defined set of rules of order.

In some embodiments, a computer readable medium is provided having processor executable instructions stored thereon for implementing a method as summarized above.

According to another broad aspect, the application provides a PoC network adapted to provide moderated talk control through: floor moderation requests that are actions from the network to indicate to a moderator wireless device that a request has been made by a particular user; and floor moderation responses that are actions from the moderator wireless device to request the network send a user's wireless device a command.

BRIEF DESCRIPTION OF THE DRAWINGS

Preferred embodiments of the application will now be described with reference to the attached drawings in which.

DETAILED DESCRIPTION OF THE PREFERRED EMBODIMENTS

In the particular examples that follow, the walkie-talkie-like capabilities are assumed to be PTT capabilities. More generally, embodiments of the application can be employed with any system providing network delivered walkie-talkie-like capabilities which are not limited to PTT capabilities of the examples.

Users on the receiving end of a group talk session held on known systems have no way of communicating to the user of the transmitting device, since the talk/transmit channel is occupied by the transmitting device until released.

With conventional devices, when a user presses the "talk button" while the device is in listen mode so as to make a request for the channel, the device simply drops the request without even forwarding it on to the network. According to the application, rather than dropping the request, a message is forwarded on to the network even if the device is in listening mode. The message that is forwarded may be in the same form as is generated when the talk button is activated during channel availability, or may be a new message. In either case, the message will be referred to herein as a transmit channel request message, or TCRM. This is transmitted over a channel from the device to the network. This can be transmitted on a separate control channel, or on the traffic channel normally used for voice communications. In an embodiment implemented in the iDEN™ system of Motorola™, a preferred logical control channel used to send a TCRM 36 is the data link layer sometimes referred to as layer 2. The TCRM could be sent over the L2 control channel, could be sent over a dedicated control channel (DCCH), or an associated control channel (ACCH). In the event the TCRM is sent over a device specific channel, it is not necessary to include a device identifier in the TCRM as the network can then determine which device sent a TCRM from the channel over which the message was received. It is noted that iDEN is an example of a network delivering walkie-talkie like capability that is not SIP based. In SIP based systems, preferably SIP over IP messages are used for the TCRM.

Figure 1:
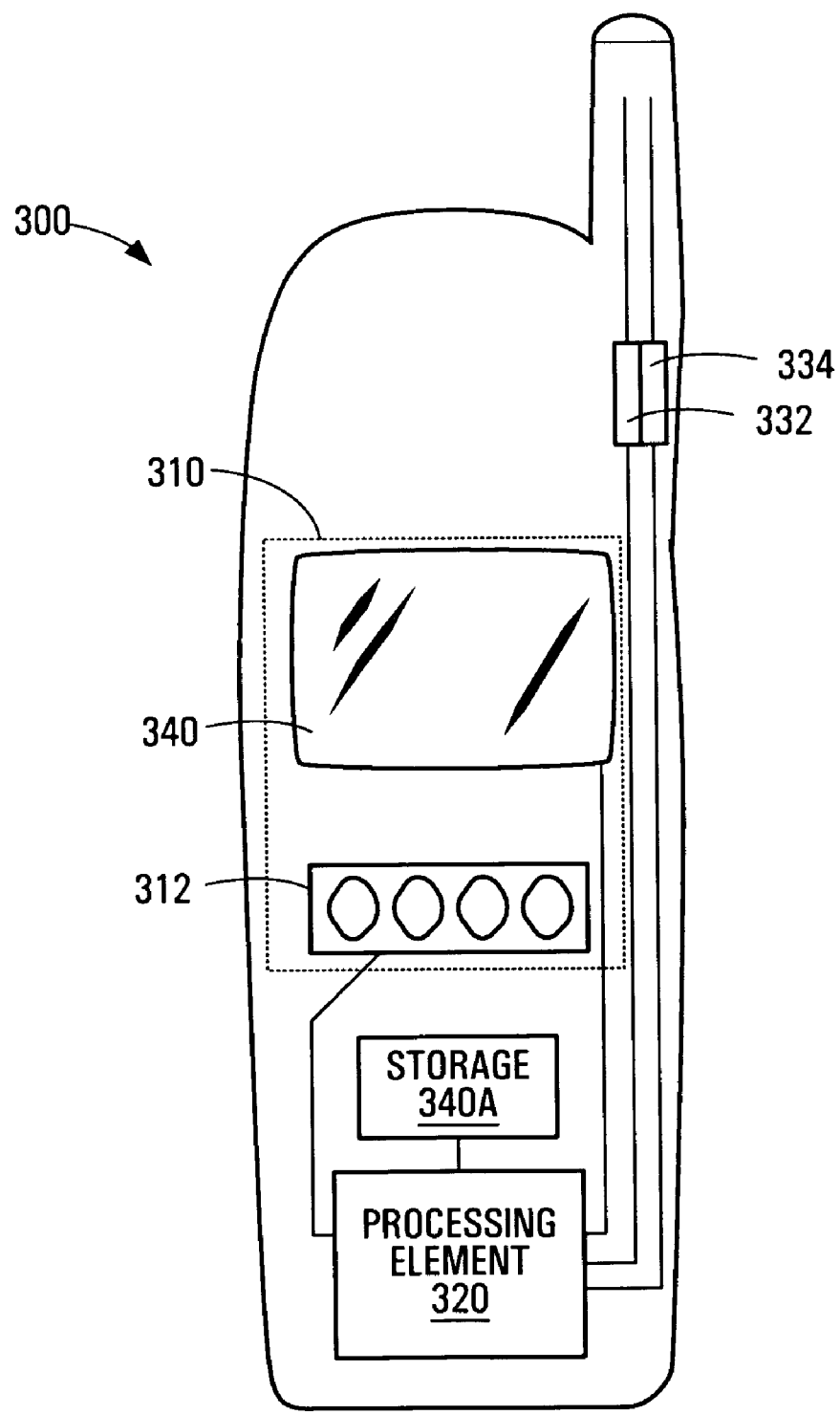
FIG. 1 is a schematic diagram of an example implementation of a wireless device provided by an embodiment of the application.

Referring first to FIG. 1, an example implementation of a PTT capable wireless device 300 provided by an embodiment of the application will now be described. It is to be clearly understood that this is but one example of a wireless device which can be employed in embodiments of the application allowing queuing and/or moderated control of talk group request processing.

It is also to be clearly understood that many other features will typically be included in an actual wireless device. These features are not shown in the interest of clarity. In the embodiment depicted in FIG. 1, the wireless device 300 has a talk request interface in the form of a keypad 312, and has a touchscreen 340. Other embodiments could include any other suitable local input/output element(s). The talk request interface is coupled to a processing element 320. The processing element 320 is coupled to message transmission element 332. The message transmission element 332 may share resources with a message reception element 334. The message reception element 334 is coupled to the processing element 320. Elements 332, 334 preferably form part of standard reception and transmission capabilities on the wireless device.

The processing element 320 represents any suitable processing capabilities implemented within the wireless device to handle the generation of TCRMs, and to handle the receipt of other messages including the below described "clear-to-talk" message (CTTM). This element may be implemented as one or a combination of hardware, software, firmware. In a preferred embodiment, the processing element 320 is included as an addition to software capabilities already provided on an existing wireless device.

In operation, the wireless device 300 depicted in FIG. 1 is able to operate in a network providing walkie-talkie-like half duplex communications capabilities in THD (transmit half duplex) mode and RHD (receive half duplex) mode. While in RHD mode, the wireless device is able to receive input from the talk request interface 312 to initiate the sending of a TCRM to the network so as to be added to a list being maintained by the network as detailed below. Once the request is input, the processing element 320 generates a TCRM possibly including the identification of the wireless device 300 and forwards it through the message transmission element 332 over an appropriate transmission resource to the network. In some embodiments, a acknowledgement capability is provided so that the wireless device can be advised that it's TCRM (or any message) has received by the network.

While in RHD mode, the wireless device is able to receive a CTTM from the network over the message reception element 334. The CTTM is input to the processing element 320, where it is processed to the extent necessary to recognize it to be a CTTM. A user detectable indication is then generated on the wireless device to indicate receipt of the CTTM, for example in the form of an audible tone, a visible signal or any other suitable indication. In some embodiments, the wireless device does not actually get the talk channel after receipt of the CTTM unless they are pressing the talk button.

Figure 2:
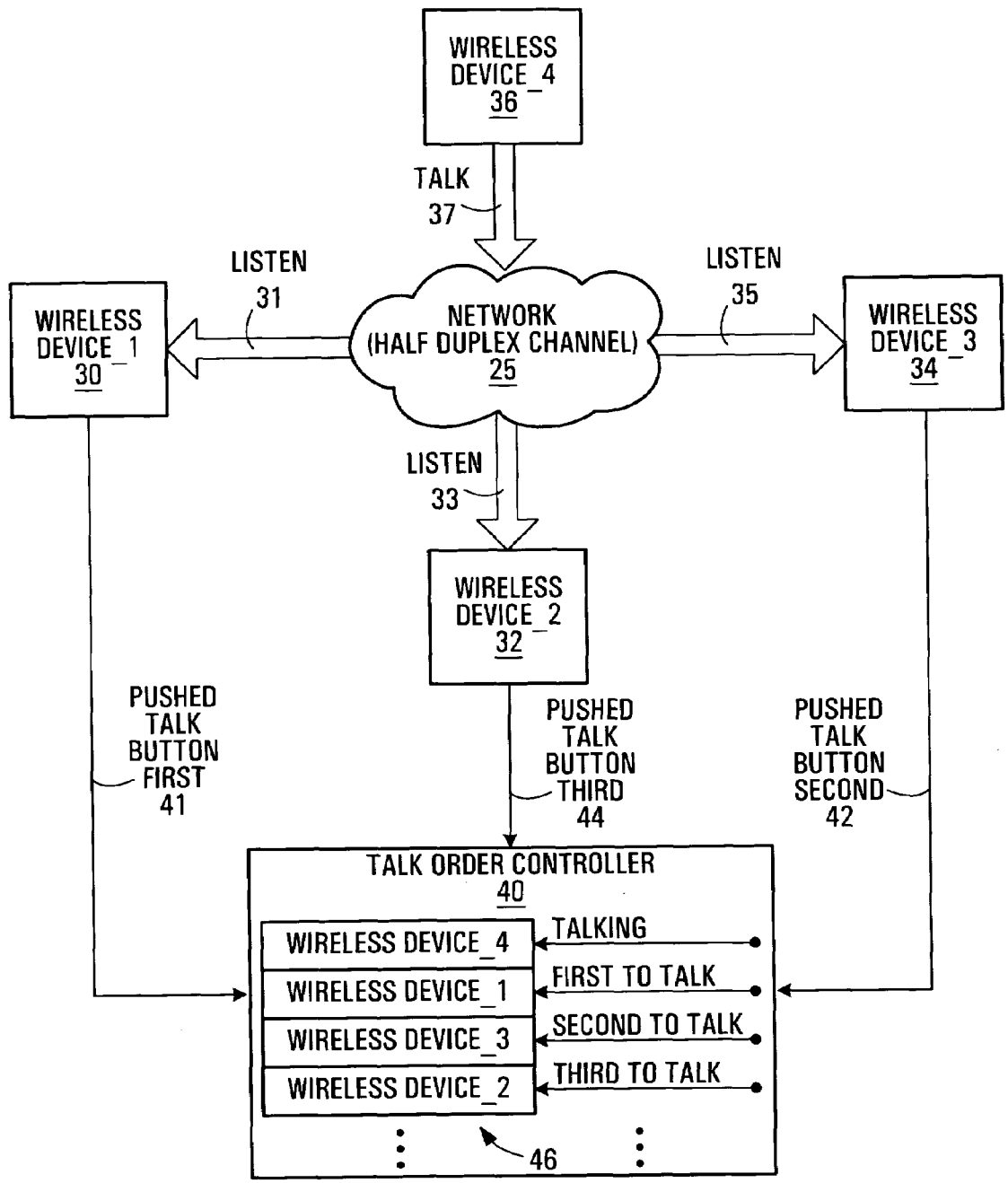
FIGS. 2-4 are block diagrams illustrating an example of queued transmit channel request messaging in an active half duplex session according to an embodiment of the application.
Figure 3:
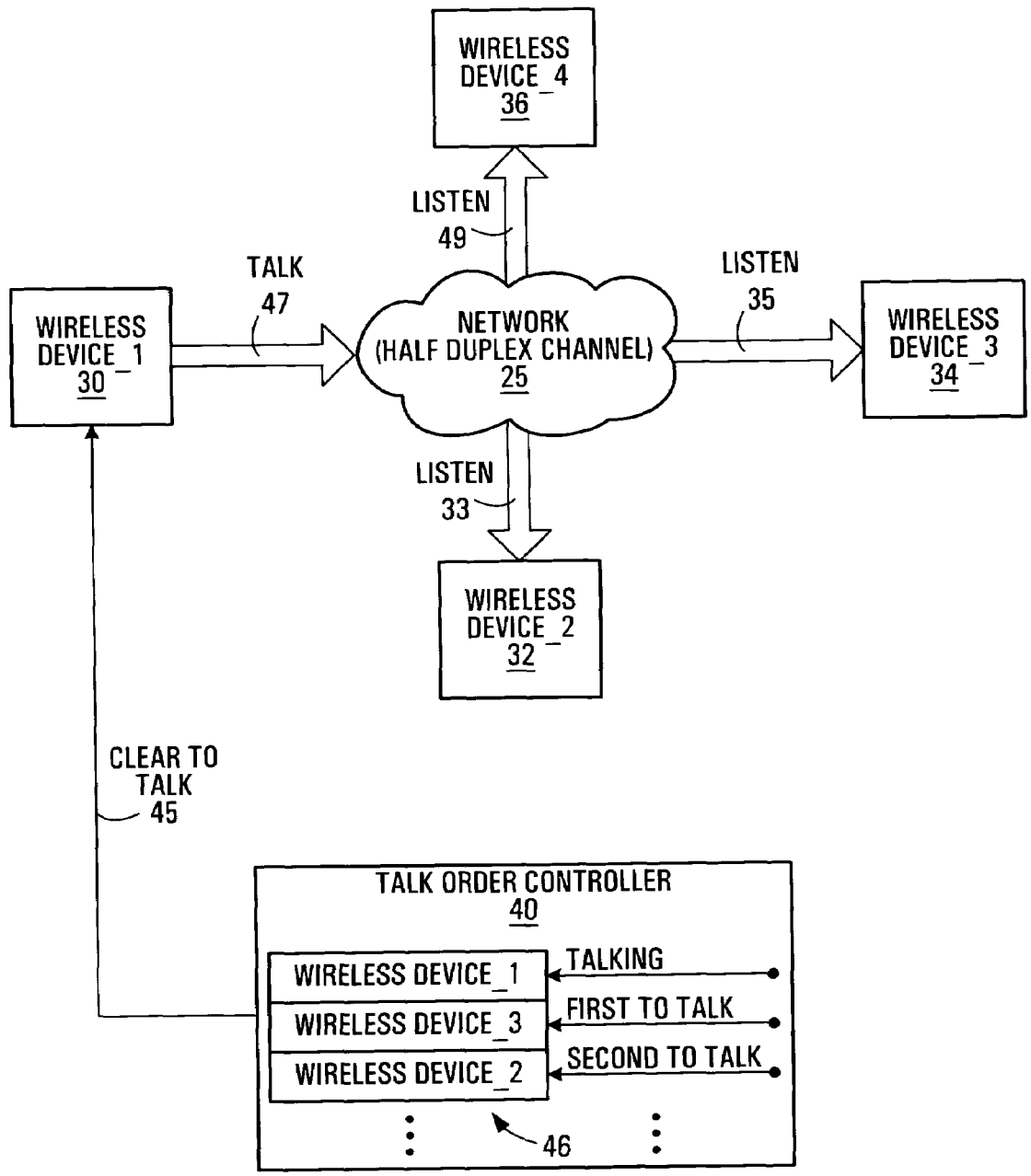
Figure 4:
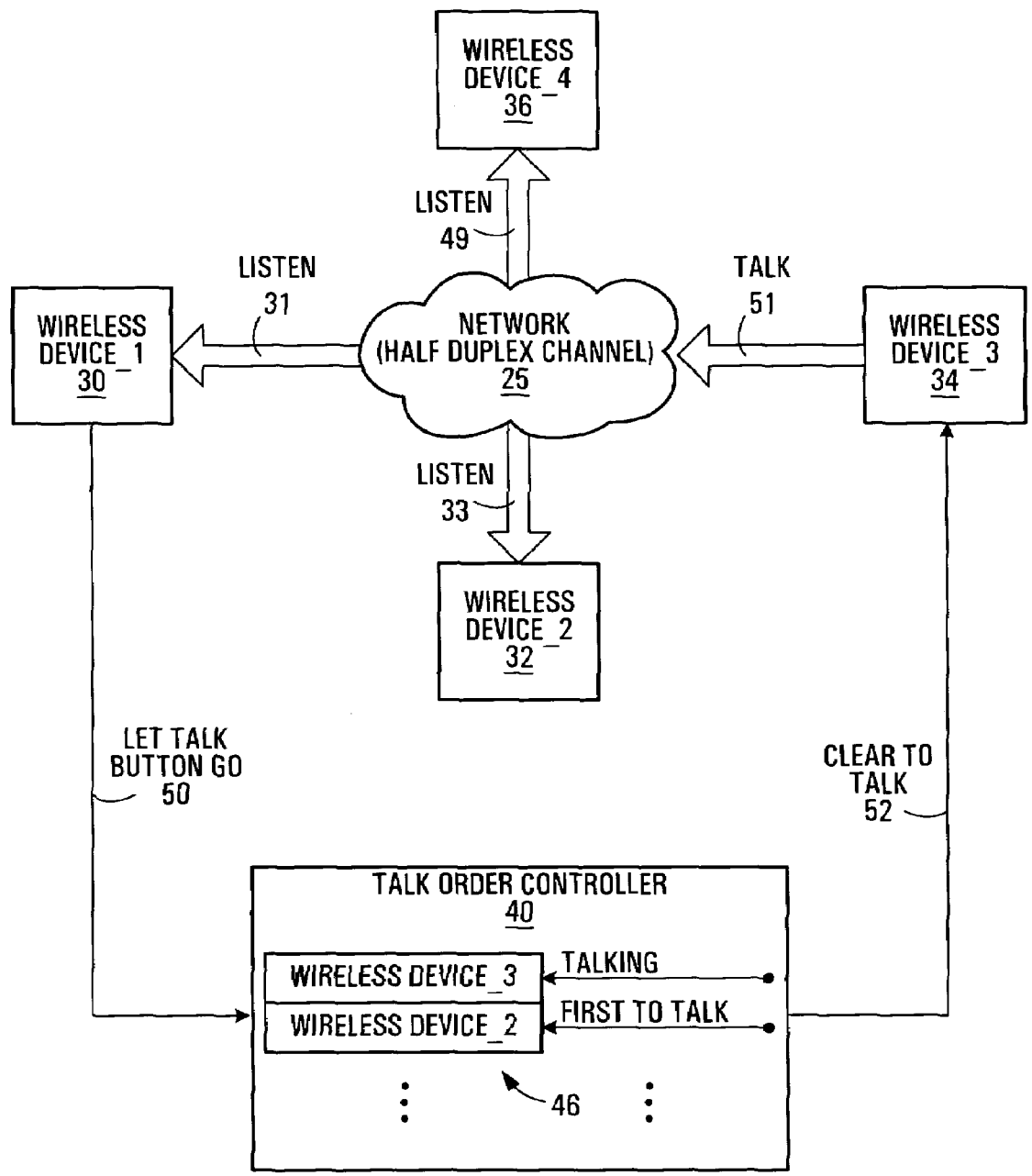

Referring now to FIGS. 2 through 4, an example of transmit channel request message queuing according to an embodiment of the application will now be described in the context of an active walkie-talkie-like call session for a group of wireless devices in a half-duplex group call.

Shown is a talk group consisting of a group of wireless devices 30, 32, 34, 36 having respective device identifiers wireless device_1, wireless device_2, wireless device_3, and wireless device_4. Each wireless device may for example be as described with reference to FIG. 1, but not limited thereto, and is shown participating in an active session with a transmit channel possessed by wireless device 36 as indicated by "talk channel" 37. In the particular instant in time represented by FIG. 2, wireless device 36 is in THD mode since it is in talk/transmit mode and in possession of the transmit channel. The remaining wireless devices 30, 32, 34 are in RHD mode, or listening mode and receive group talk signals over "listen channels" 31, 33, 35 respectively. It should be understood that embodiments of the application are more generally applicable in a group call session involving an arbitrary number of wireless devices. To simplify this description, a device in THD mode or RHD mode will be referred to as a THD device or an RHD device respectively. However it is to be understood these are temporary designations for the particular mode of operation of the device at any particular time. During the active session, the users of the RHD devices (30, 32, 34) are referred to as listeners, while the user of the THD device 36 is referred to as the talker. Each device of the specific example shown in FIG. 1 is capable of functioning either as a THD device and an RHD device, depending upon which device is in talk/transmit mode and which devices are in listening mode during any particular active session. Each device has a "talk" button, or other suitable user interface hereafter referred to as a "talk request interface" for requesting access to transmit on the half duplex channel. This talk request interface may be the same as, or in addition to the "talk" button of conventional walk-talkie-like capable wireless devices.

The establishment of the physical links between devices of the users, the routing of voice data packets, and the duplication of voice data packets to each of the devices in listening mode are specific to each implementation of a PTT™ or similar half-duplex voice communication system. These functions are represented abstractly by a network 25 which represents all of the system components necessary to provide half duplex communications for communicating the voice data sent by the THD device 36 on link 37 to all of the RHD devices 30, 32, 34 on links 31, 33, 35 and in general support the functions of an active session. The details of these links are not relevant here. During the active session, the THD device 36 possesses the talk/transmit channel until it requests release of the channel or terminates the call.

Also shown is a talk order controller 40 provided by an embodiment of the application. The talk order controller in one embodiment is implemented as part of the network 25. The talk order controller 40 is preferably implemented as an extension to software which runs on existing processing capabilities provided by the network 25, but more generally may be any suitable combination of one or more of hardware, software or firmware. The talk order controller receives TCRMs, and performs a queuing operation as detailed below. In addition to receiving TCRMs, the talk order controller 40 generates. "clear-to-talk" messages (CTTM) which are each transmitted to a particular wireless device to indicate the particular wireless device is to be next given the opportunity to use the transmit half duplex channel. Like the TCRM, the CTTM is transmitted by the network on any appropriate channel to a wireless device and can come in any form, the only requirement being that a wireless device in listening mode be capable of recognizing the message for what it is. In a PoC implementation, the PoC might for example house the talk order controller. An example of a TCRM message is the PoC specification's "floor request" message, and an example of a CTTM message is the PoC specification's "floor grant" message.

The talk order controller 40 receives TCRMs and maintains associated device identifiers in sequence so that the sequence from oldest TCRM to newest TCRM is known. When the transmit channel becomes available, for example by a previous user letting go of the talk button, the talk order controller sends a CTTM to the wireless device whose identifier has been on the list the longest. Storing the wireless device identifiers in a FIFO (first-in-first-out) buffer achieves this functionality. Once a wireless device has been given the talk channel, the associated identifier is removed from the list being maintained by the talk order controller 40. Alternatively, the identifier can be maintained in association with a state which indicates the particular device has the transmit channel.

In the example of FIG. 2, during an active session a listener's device 30 in listening mode sends a transmit channel request message (TCRM) 41 in response to external input from the listener via the talk request interface. The TCRM 41 is received by the network 25 and forwarded to the talk order controller 40, although for simplicity the Figure simply shows the message being received directly by the talk order controller 40. The talk order controller 40 maintains a list 46 of device identifiers of users who have transmitted TCRM messages. As such, upon receiving the TCRM 41 from the wireless device 30, the device identifier wireless device_1 is added to the list 46.

In the illustrated example, some time later, wireless device 34 generates a TCRM 42 which is also forwarded to the talk order controller 40 and added to the list 46. Later still, wireless device 32 generates a TCRM 44 that is also forwarded to the talk order controller 40 and added to the list 46. In the illustrated example, the list 46 is shown to contain entries wireless device_1, wireless device_3 and wireless device_2 for the three wireless devices 30, 34, 32 in the sequence the TCRMs 41, 42, 44 were received. An entry wireless device_4 is also shown for mobile device 36 which is currently in possession of the talk channel.

The list 46 is maintained on an ongoing basis to add new entries for wireless devices that have sent TCRMs. The entry for each wireless device is any entry that can be uniquely associated with the wireless device that transmitted the TCRM. This might be a wireless device identifier for example. In the illustrated example, each entry in the list 46 also has an associated state. The state for wireless device_4 36 is "talking"; the state for wireless device_1 30 is "first to talk"; the state for wireless device_3 34 is "second to talk"; the state for wireless device_2 32 is "third to talk". Additional states are introduced below. In a simple implementation in which only queuing is performed, there is no need to maintain state information as the required sequence information would be completely inferable from the list.

The state of the arrangement of FIG. 2 is shown as it might appear at a later time in FIG. 3. Now the wireless device which was using the talk channel, wireless device 36 in the example of FIG. 2, has given up the channel and is listening on listen channel 49. The talk order controller 40 determines the next wireless device to be given the opportunity to take the channel by consulting the list 46. In the illustrated example, wireless device_1, the identifier for wireless device 30, is next on the list. The talk order controller 40 transmits a CTTM 45. After receipt of the CTTM by wireless device 30, wireless device 30 is free to communicate on forward half duplex channel 47 from wireless device 30 to the network 25. In the event the CTTM is sent on a device specific channel, wireless device 30 will be the only one to receive the message so no device identifier need be included in the CTTM. If a broadcast channel is used to transmit the CTTM, it would need to be accompanied by or include the device identifier.

The state of the arrangement of FIG. 3 is shown as it might appear at a later time in FIG. 4. Here, wireless device 30 has let go of the talk button (or other talk request interface) to release the talk channel, as indicated at 50. The talk order controller 40 determines that wireless device_3 for wireless device 34 is next in the list 46 and sends a CTTM 52 to that wireless device to grant it access to the talk channel 51.

Figure 5:
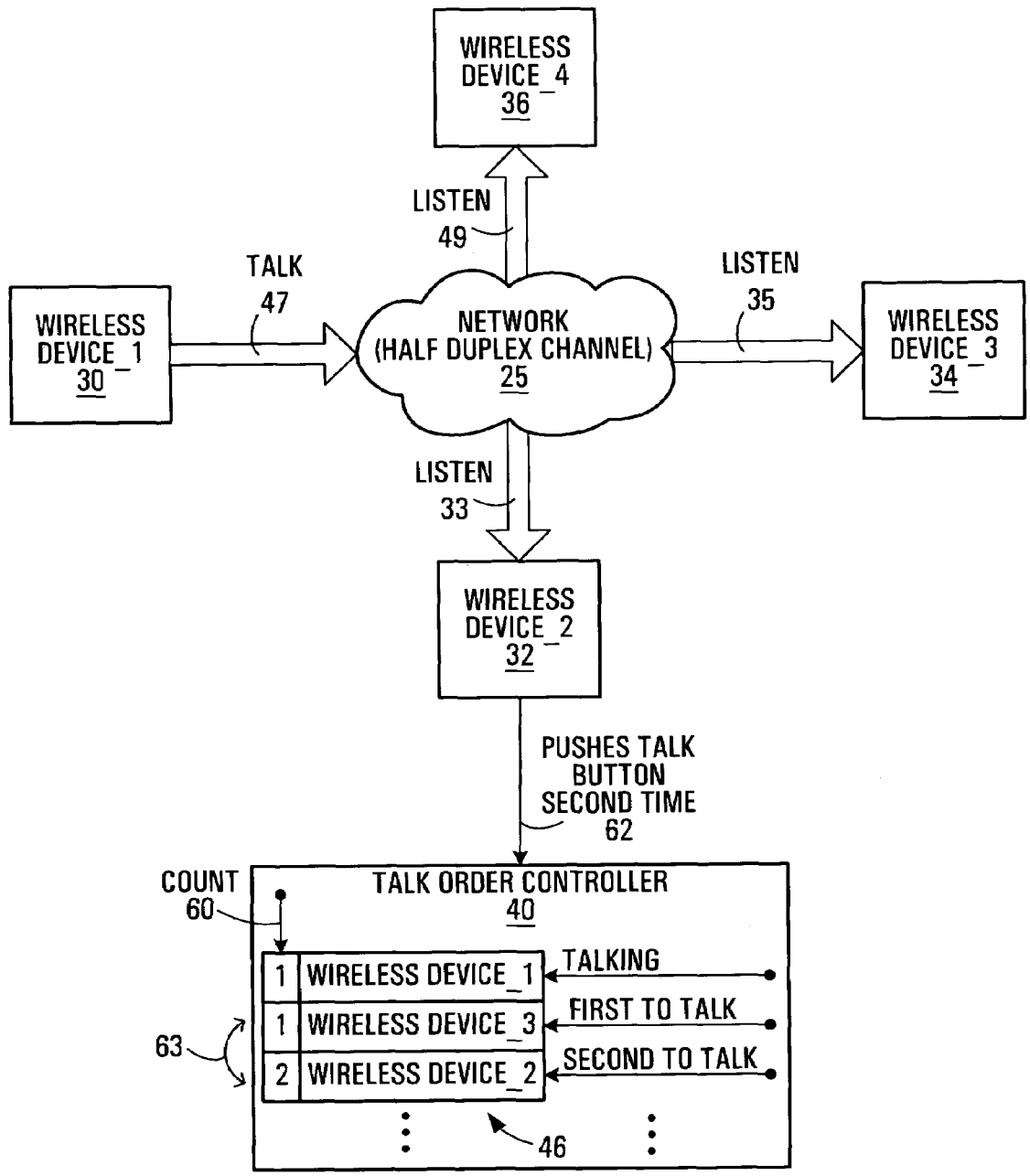
FIG. 5 is a block diagram illustrating an example of prioritized talk order queuing according to an embodiment of the application.

In another embodiment, a mechanism is provided for modifying the order of the list of wireless devices which have requested access to the talk channel. In a first implementation of this feature, illustrated by way of example in FIG. 5, the talk order controller 46 maintains a count of how many times each user has sent a TCRM. In the example, the count is maintained in column 60, which shows at a given instant in time, that wireless device 30 has generated one request and is in fact currently in possession of the talk channel, wireless device 32 has generated one request, and wireless device 34 has generated two requests, the second such request indicated at 62. Generally, the talk order controller 40 monitors the counts of TCRMs received, and re-orders the list so that users that have transmitted more TCRMs are prioritized above those users that have transmitted fewer TCRMs. In the illustrated example, this is shown by the reordering of wireless device_2 and wireless device_3 indicated at 63.

Figure 6:
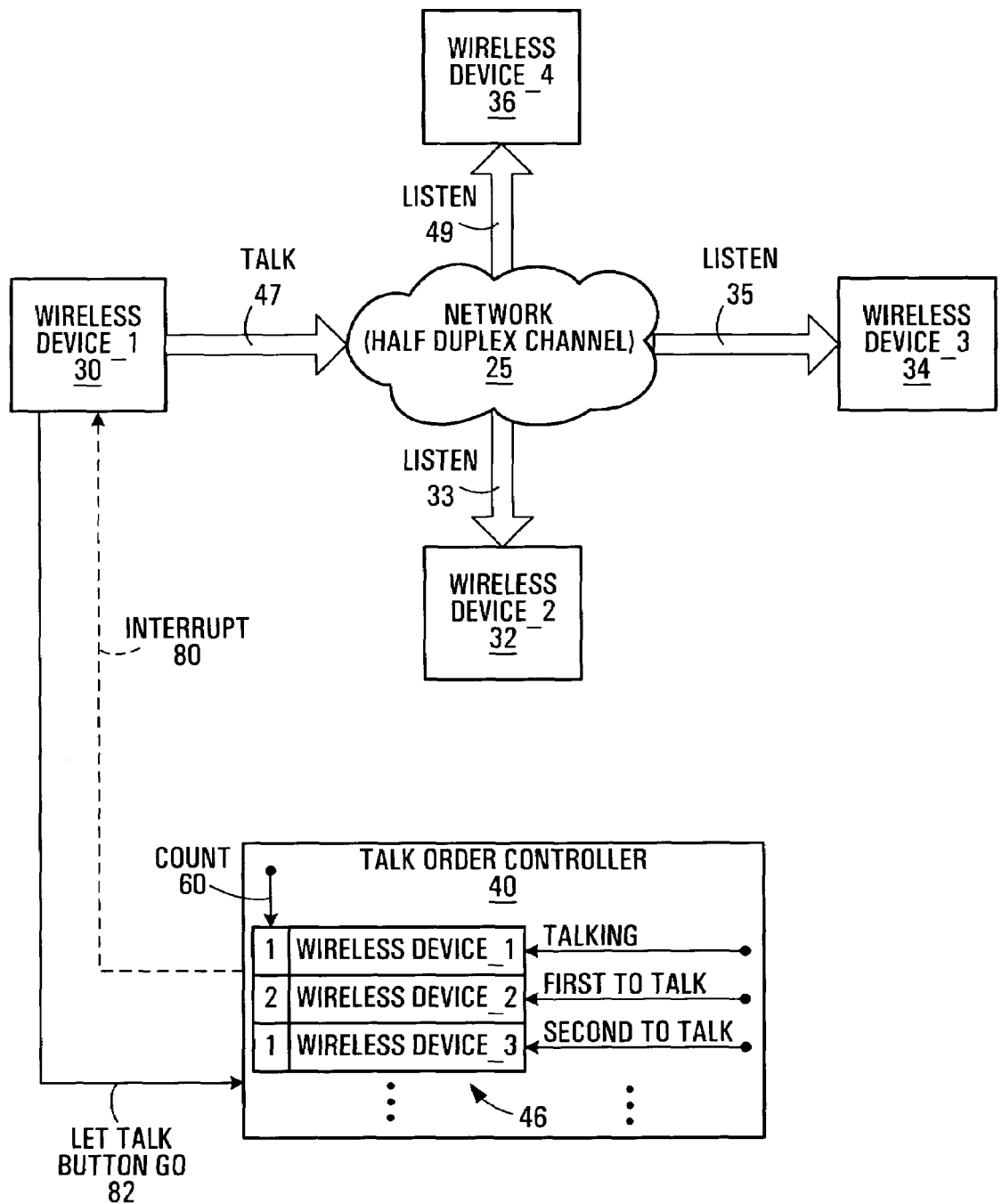
FIGS. 6 and 7 are block diagrams illustrating an example of interrupt talk order control according to an embodiment of the application.

In another example implementation of this additional feature, shown in FIG. 6, there is a further messaging capability from the talk order controller 40 to the wireless devices which enables it to interrupt a wireless device which is currently in possession of the talk channel. In the example illustrated in FIG. 6, such an interrupt 80 is shown being transmitted from the talk order controller 40 to wireless device 30. In response to this, the wireless device 30 gives up the talk channel 47 by letting go of the talk button as indicated at 82. In one preferred embodiment, the wireless device 30 automatically, upon receipt of the interrupt 80, and without any input/release of talk button from a user of the device, gives up the talk channel, with optional notification to the revokee. In another embodiment, the interrupt 80 serves as encouragement for the user of the wireless device which receives it to let go of the talk channel. The interrupted wireless device can either be completely taken out of consideration for access to the talk channel, or it can be added to the list of wireless devices in line to access the talk channel in which case the wireless device can for example be added to the end of the list, or to the top of the list. In the embodiment exemplified in FIG. 6, wireless devices are further equipped to receive the interrupt 80, and to process it and generate either an indication to the user, or simply disconnect from the talk channel, depending on a given implementation.

Figure 7:
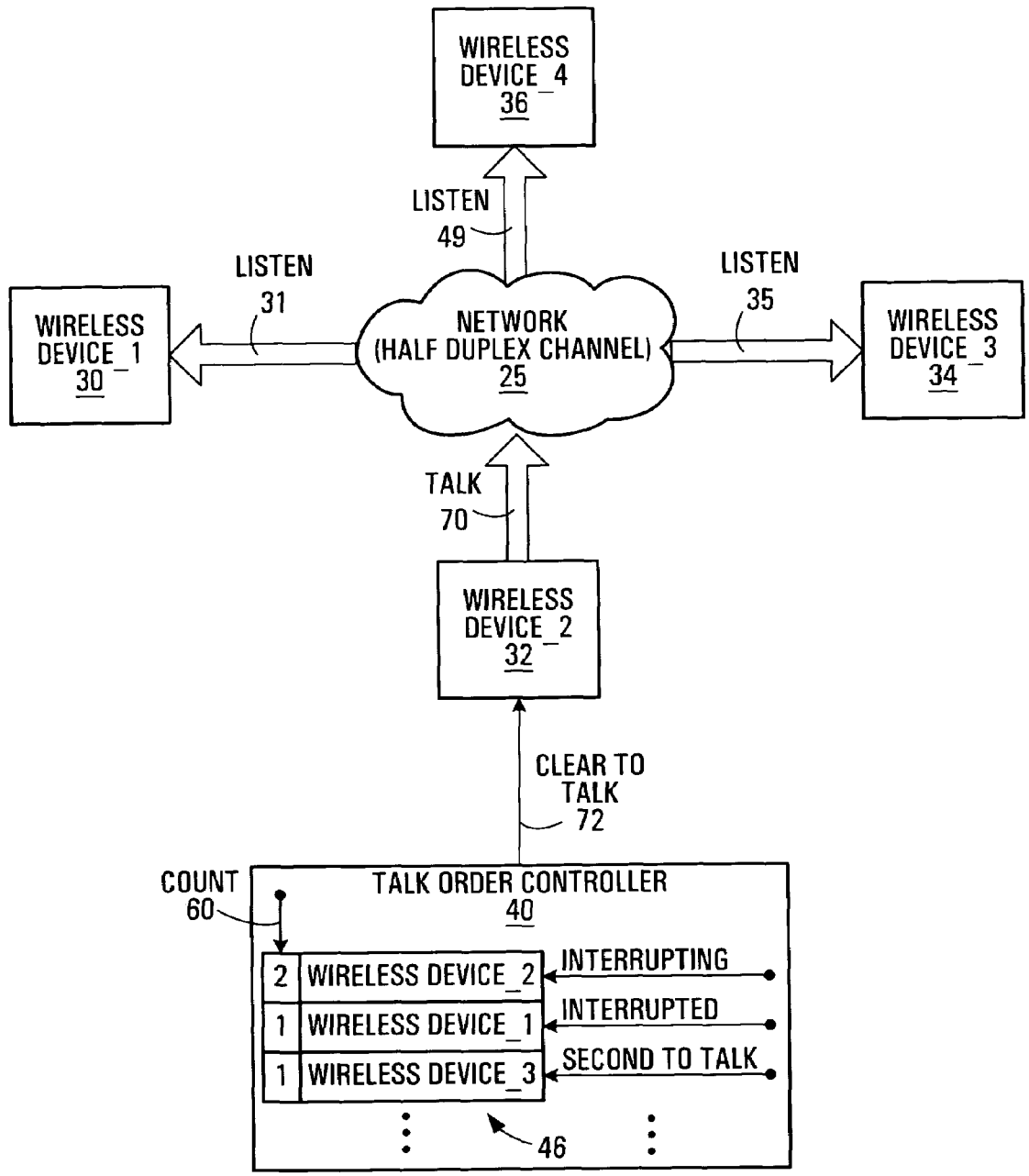

The example of FIG. 6 is shown some time later in FIG. 7. Now, the wireless device 32 is shown in the interrupting state having been sent a CTTM 72, and has access to talk channel 70; wireless device 30 is in the interrupted state, and wireless device 34 is at the bottom of the list 46. In this example, wireless device 34 will remain interrupted until wireless device 32 releases the talk channel after which the talk channel will be returned to wireless device 30.

In some embodiments, a wireless device that is on the list waiting to access the talk channel is further capable of removing itself from the list. In one embodiment this is achieved by simply re-activating the talk request interface which sends an additional TCRM which is interpreted by the talk order controller 40 as a request to remove the wireless device from the list. In another embodiment, a different interface is provided on the wireless device which when activated causes a different message to be sent to the network which is interpreted by the talk order controller as a request to remove the wireless device from the list.

The talk order controller may be implemented as part of the network, part of one of the devices in the groups, or part of some other device. In other embodiments described in further detail, moderation capabilities are provided through moderator functional elements. The moderator functional element can be considered a specific example of a talk order controller. In yet other embodiments described in detail below, the talk order controller is responsible for enforcing a set of rules of order.

In the embodiments described thus far, the queuing of TCRMs has been performed by the talk order controller that forms part of the network. In another embodiment, control over the talk channel is moved away from the network to one or more wireless devices having an active moderator functional element. Preferably, in this embodiment, all wireless devices are implemented with the moderator functional element, but the capability is only activated in a selected wireless device or devices at a given instant. This capability may for example be granted by the moderation messaging controller based on the group list that the device is activating. Wireless devices having an active moderator functional element will be referred to as moderator wireless devices. In this embodiment, a moderation messaging controller is provided within the network or adjunct to the network to control the flow of messages between talk group participants. Preferably, these messages include the previously introduced TCRM which is received by the moderation messaging controller and forwarded to an appropriate moderator wireless device, and include the CTTM which is generated by an appropriate moderator wireless device and transmitted to a wireless device which is to be granted access to the talk channel.

In one example of moderated group talk, a list similar to list 46 of previous embodiments is maintained by the moderator wireless device as communicated by the moderation messaging controller, and the moderator wireless device has the ability to control the order in which wireless devices which have requested the talk channel are granted access, and in some embodiments the moderator wireless device also has control over a length of time a given wireless device is granted access.

Figure 8:
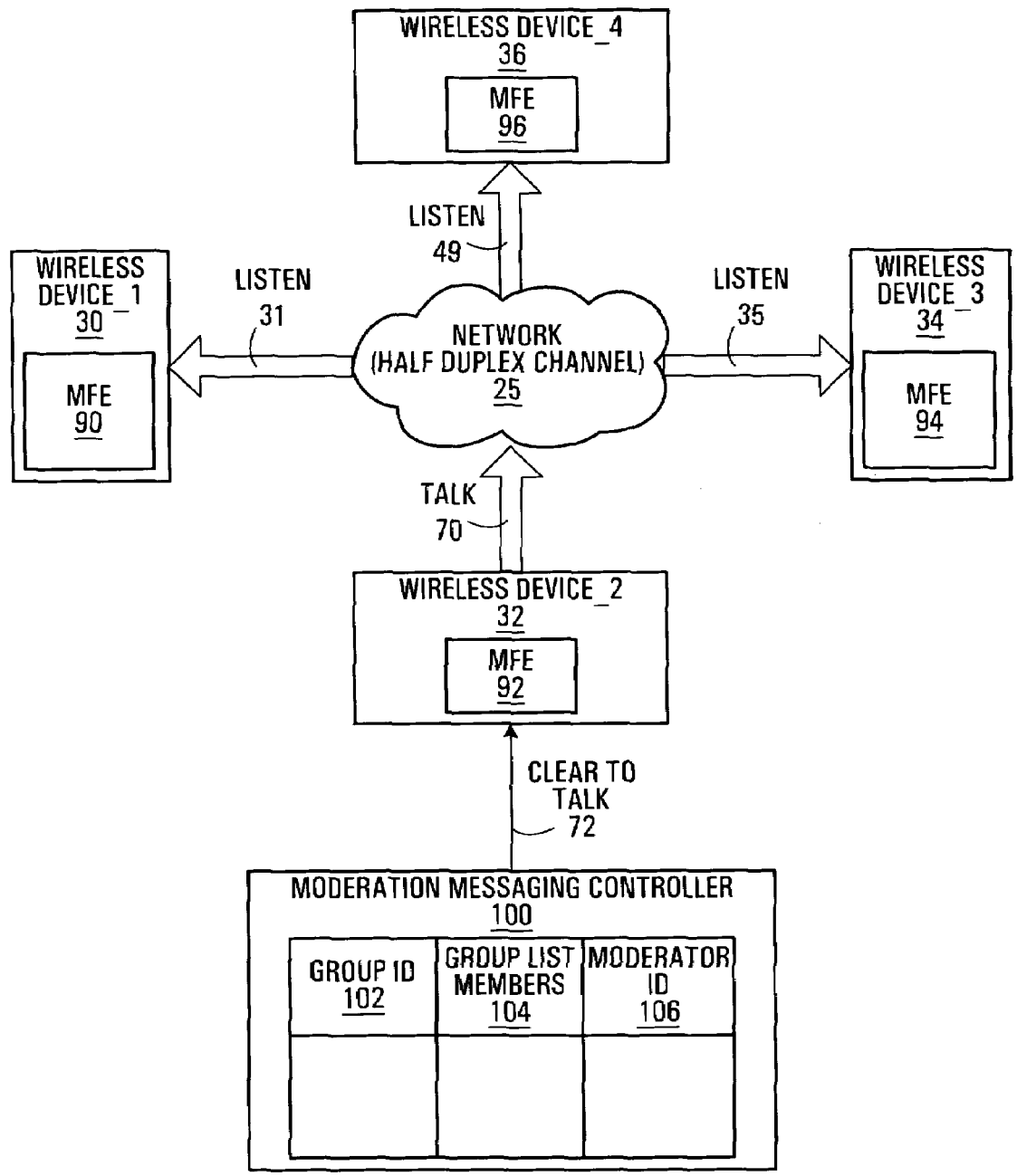
FIG. 8 is a block diagram illustrating an example of moderated talk order control according to an embodiment of the application.

Referring now to FIG. 8, shown is an example of a network with moderation capabilities. In this network, there is a moderation message controller 100 which, like the talk order controller of previous embodiments, is preferably implemented as part of the network 25. For example, it may be included as part of a group list management function within the network or as a logical combination of the GLMS and the PoC server. The moderation message controller 100 maintains an identifier for each group list of the wireless device that is responsible for moderating group talk among the group list, if the group list is to be moderated. This can be set up as a static characteristic of the group list which is configured during list setup. Alternatively, the wireless device that is to be the moderator can be configured in real time. In one embodiment, group lists are defined using a web-based interface, and the creator of the group is given the privilege of selecting a moderator. In the illustrated example, wireless devices 30,32,34,36 each have a respective MFE (moderator functional element) 90,92,94,96 which for a given device is active if designated the moderator.

The moderation message controller 100 acts as a relay for conveying messages between devices without moderator privilege and the moderator device. For example, TCRMs generated by listening wireless devices are forwarded by the moderation message controller 100 to the moderator wireless device for the group. The moderator wireless device generates CTTMs which indicate a particular wireless device is to be given the talk channel. Such a CTTM contains the identifier of the particular wireless device. The moderation message controller 100 then forwards this message on to the particular wireless device. An example of a data structure which might be maintained by the moderation message controller 100 is illustrated in FIG. 8. The data structure has a column 102 for group list identifiers; a column 104 for the group list members of each group list identified in column 102; and a column 106 to indicate the identifier of a moderator wireless device if any. This structure is used to determine whether and to whom to forward a received TCRM.

The MFE of the moderator wireless device receives TCRMs from other wireless devices via the network 25 and maintains a list of identifiers of wireless devices which have transmitted the TCRMs. Preferably, this list is made available to a user of the moderator wireless device, for example on a text or graphical display.

In one embodiment, a release talk message is also forwarded to the moderator message controller when a wireless device releases the talk channel. This can be generated by the wireless device when the talk channel is released, or alternatively can be generated autonomously by the moderator message controller detecting or being informed that the channel has been released.

In one embodiment, the MFE responds to the receipt of the release talk message by sending a CTTM to the device which is scheduled or chosen to next receive the talk channel. In another embodiment, once the release talk message is received, the MFE generates an indication on the moderator wireless device to prompt the user of the device to select the next wireless device to be given the talk channel. In response to such a selection a CTTM to that device is generated.

In another embodiment, a hierarchy of moderation is configurable. With this embodiment, multiple sub-groups of devices are moderated independently, for example, each with a respective moderator using the same approach as outlined above for a single moderated group. However, access to the talk channel by one moderated sub-group or another is controlled by a higher level moderation, or by queuing as described earlier. In this case, the higher level moderation can be performed similar to that outlined above for a single moderated group, but instead of individual wireless devices vying for the talk channel, the moderated sub-groups are vying for the channel.

In another embodiment, a plurality of privileges are defined. Each wireless device is categorized to have the privileges as required. Examples of privileges include but are not limited to:

moderator capability—the device is given active moderator status;

moderator meta-group capability—several group moderators form a 'meta group', without a meta-group moderator for that meta group, implementing standard talk group features for the meta-group;

private messaging within sub-group—the device is granted the right to send private messages within a talk group;

public messaging—the device is granted the right to send a broadcast message within a talk group;

talk channel request access—the device is allowed to transmit TCRMs, and will be granted the talk channel under moderator control;

listen-only access—the device will not be granted the talk channel but can listen only.

These privileges in some embodiments are maintained by the moderation message controller, through an administrative interface which might be web-based for example. The moderation message controller then processes a message received from a talk group member in accordance with the privileges that wireless device has.

DTMF Embodiment

In one embodiment, particularly suitable for, but not limited to PoC applications, either for queuing or moderation, signaling between the various devices is achieved using DTMF (dual tone multi-frequency) signaling. DTMF has 16 codes including 12 on a typical keypad, and four additional codes A, B, C and D which are typically capable of being generated but are not used. DTMF codes sent from wireless devices to the network are preferably filtered out at the network such that they do not appear on an audio channel. Similarly, if any DTMF codes are sent to a wireless device, preferably, the wireless device filters those out and processes them accordingly. In one embodiment, DTMF tones are used to perform signaling between wireless devices to indicate one or more of:

release of talk button;
clear to talk message;
interrupt message;
mute order.

In the embodiments described herein the network participates in setting up the required talk and listen channels. For example, in the queuing embodiments, when a next user is to be given the transmit channel, the previous transmit channel is de-activated if not already done, and a new transmit channel is activated if necessary, and a new listen channel to the previously active wireless device is set up. In some embodiments, a transmit and receive channel may be maintained on an ongoing basis between each wireless device and the network, but the system only allows transmission and reception in a half duplex manner as described herein to deliver walkie-talkie-like functionality.

Similarly, for the moderator embodiments, when a grant is received from a moderator wireless device, the grant is forwarded on to the appropriate wireless device, but the network also must set up the required transmit channel from the wireless device if such a channel is not already available. Because existing walkie-talkie-like systems are well established and have the ability to shift the talk and listen channels around as required further details will not be presented herein.

In a preferred embodiment, the application is implemented as a series of changes to a PoC specification such as defined in the Industry Specification for PoC, Oct. 6, 2003 incorporated herein by reference in its entirety.

Moderated Group Talk PoC Specification Changes:

1) Add "user class" and in some implementations also "meta groups" to the GLMS group list management function PoC-List Management defined in the above-referenced document.

2) Provide two new floor control messages to be implemented on the PoC server, associated with new capabilities in GLMS group list management in the document referenced above.

Existing PoC server floor control capabilities are summarized as follows:

floor request: the action provides the capability for a participant in a talk session to ask for permission to talk.

floor release: the action taken by a granted user to release their permission to talk.

floor grant: an action from the network to inform requesting participant that the floor has been granted.

floor idle indication: an action from the network to inform participants that the floor is idle.

floor deny: an action from the network to inform the requesting participant that the floor request is denied.

floor taken: an action from the network to inform all participants that the floor has been granted to the indicated user.

floor revoke: the action from the network to remove the permission to talk from a user who has previously been granted the floor The new PoC server floor control capabilities which are added in one embodiment of the application to facilitate moderated group talk are as follows:

floor moderation request: an action from the network to indicate to a UE that a request has been made by a particular user;

floor moderation response: an action from the UE (moderator) to request the network send a user a command or to send a command to the entire talk group. The floor moderation response is intended to imbed any of the standard floor control capabilities, such as floor revoke, floor grant etc. The UE in this case may implement automatic or manual queuing requests for multiple users.

With these additional capabilities, the talker arbitration function normally performed through the use of RTCP (real time control protocol) is relinquished to the group moderator.

In the event the Meta Groups function is implemented, Meta Groups themselves would preferably continue to be arbitrated via RTCP. Meta Groups may be considered as a distinct talk group, with standard floor control capabilities, such as floor revoke, floor grant etc., but only between moderators. Once the 'Meta-floor' is granted to a particular moderator, that moderator in turn grants the floor to a member of her own group. While the 'meta-floor' is idle, group talk is constrained to singular groups. While the 'meta-floor' is granted, all talk groups comprising the meta-group may hear the conversation.

The conventional GLMS List Management Functions include:

Contact lists storage used for storing contact entries in the GLMS server. (POC server and UE)

Group lists are used to define PoC specific groups. (POC server and UE)

The additional GLMS List Management Functions implemented in this specific embodiment of the application include:

User Class—Apply particular profiles to the members of the group list in terms of floor requests as follows:
    listen access,
    listen and floor request access
    listen and floor request and floor moderation response access (only for the single moderator of the talk group).

Meta Groups—For moderated group talk between 'n' distinct moderated talk groups. The overall floor belongs to the group member of the group that holds the Meta Group floor at a particular time. Only moderated groups may be added to Meta groups Access lists are used to define access rules, that is who is allowed or not allowed to reach a specific user via PoC In some embodiments, overlaid on the basic structure of Moderated Group talk are standard features such as instant message text/MMS alerts to members within a group and/or private chat groups within a group.

Figure 9A:
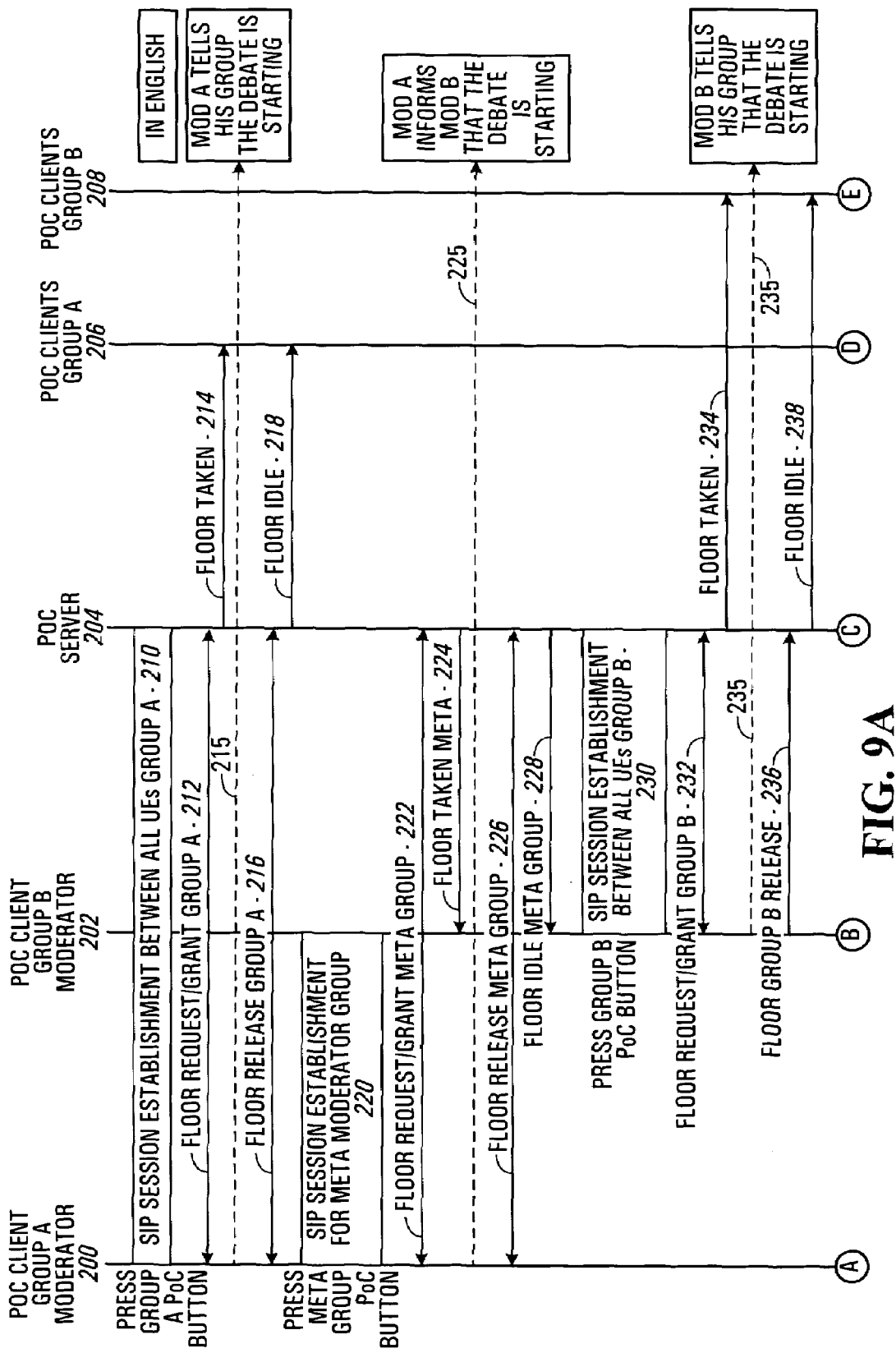
FIGS. 9A, 9B and 9C are a signal flow diagram of an example implementation of moderated talk group connectivity in a PoC implementation.
Figure 9B:
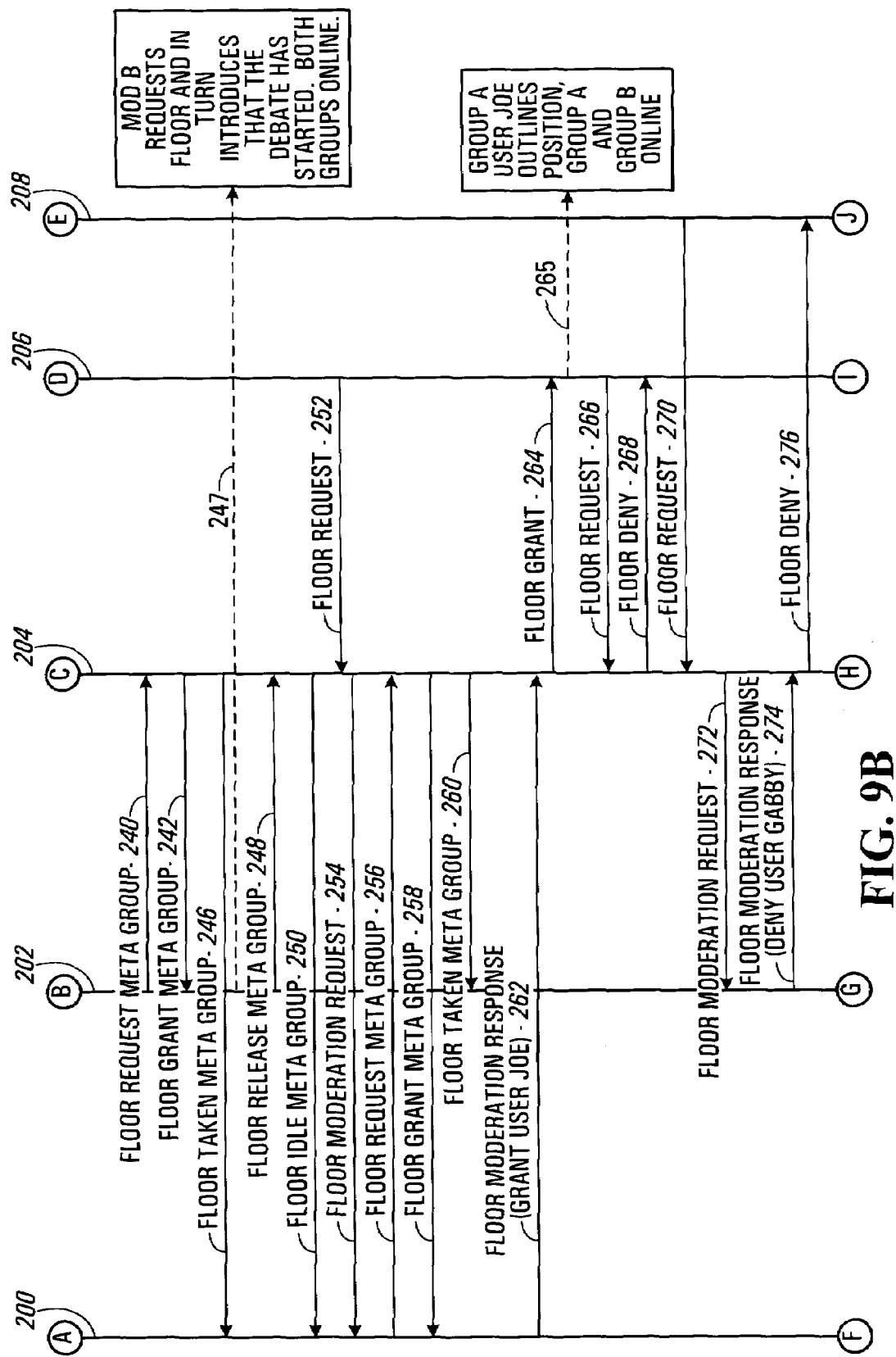
Figure 9C:
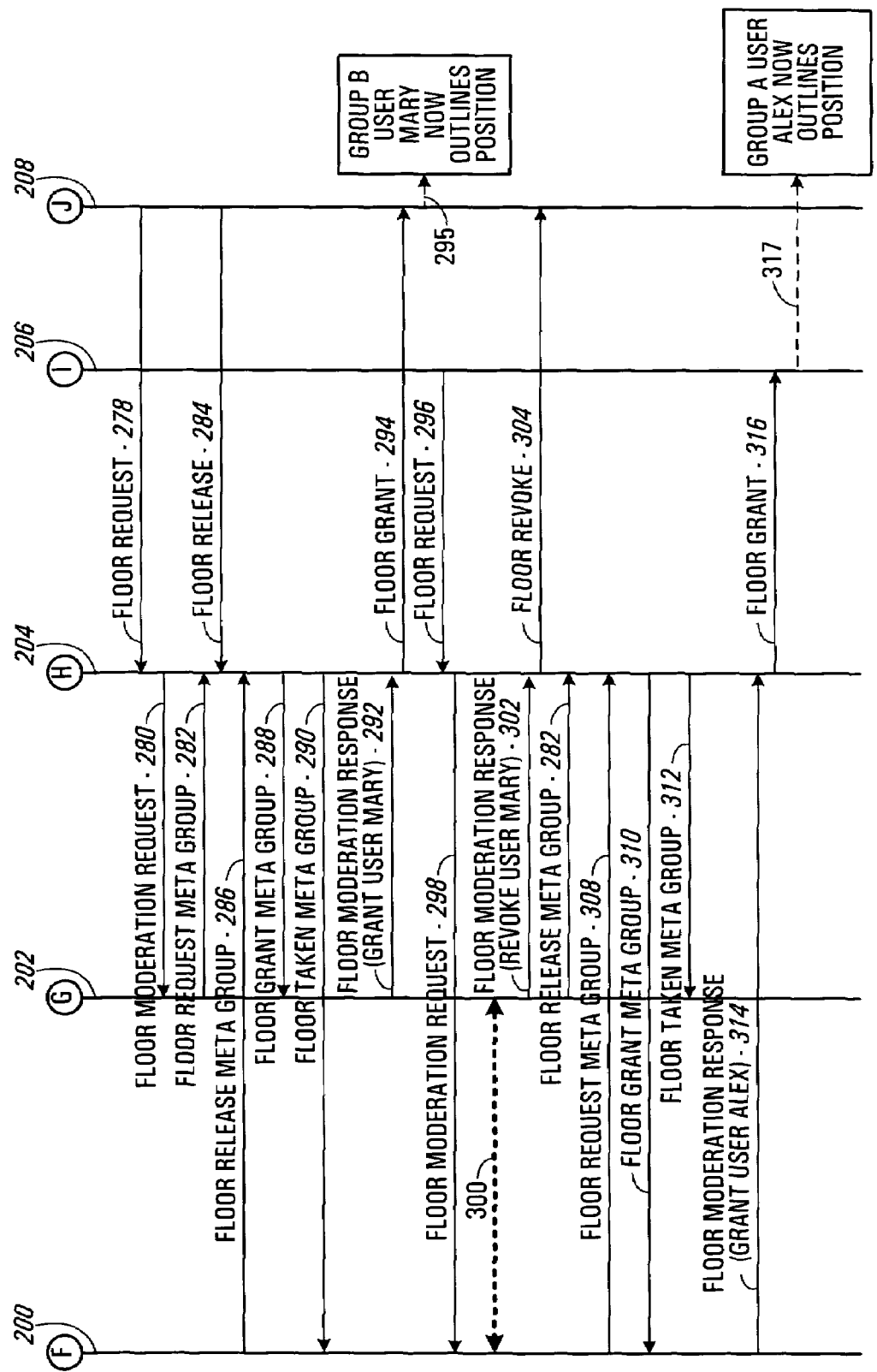

Referring now to FIGS. 9A, 9B and 9C shown is a detailed called flow diagram to illustrate an example implementation of moderated group talk in a PoC implementation. For this example 'debate', it is assumed that there are two separate groups which are being moderated by respective group moderators. Access to the floor between the two groups is being performed by the RTCP as per the standard PoC approach. Signaling is shown between PoC Client Group A Moderator 200, PoC Client Group B Moderator 202, PoC Server 204, PoC Clients Group A 206, and PoC Clients Group B 208. PoC Clients Group A 206 represents the members of the group being moderated by PoC Client Group A Moderator. Similarly, PoC Clients Group B 208 represent the clients being moderated by PoC Client Group B Moderator 202.

Starting in FIG. 9A the session starts with a member of Group A pressing a PoC button which results in the establishment of a SIP session between all UEs of Group A as indicated at 210. All detailed PoC messages may not be shown for clarity. This is followed by the PoC Client Group A Moderator 200 sending a floor request 212 for Group A to the PoC Server 204. The floor taken is sent at 214 to PoC Clients in Group A. At 215, the PoC Client Group A Moderator verbally (or via alternative message formats such as IM) tells the members of Group A that the debate is starting. After this, the PoC Client Group A Moderator 200 releases the floor as indicated by 216 after which the floor becomes idle as indicated at 218. Up until this point, while the PoC Client Group A Moderator 200 is behaving as a moderator, no moderation has yet being established. At 220, PoC Client Group A Moderator 200 presses a Meta Group PoC button. More generally, any suitable user interface may be activated by the PoC Client Group A Moderator in order to establish a Meta Moderator Group to be facilitated by PoC Client Group A Moderator 200 and PoC Client Group B Moderator 202. At step 222, the PoC Client Group A Moderator 200 requests the floor with Floor request/Grant Meta Group 222 and the floor is taken at 224. The 'floor taken' message 224 means that the PoC server informs Moderator B that the floor is taken. At this point, Moderator A informs Moderator B that the debate is starting as indicated at 225. PoC Client Group A Moderator 200 then releases the floor at 226 and PoC Server 204 responds with the Floor Idle Meta Group 228.

Subsequently, the PoC Group B Moderator 202 presses its PoC button in order to establish a group talk session between the members of Group B as indicated at 230. PoC Client Group B Moderator 202 requests the floor as indicated at 232 after which the floor is taken as indicated at 234. Then, the Group B Moderator tells his group that the debate is starting as indicated at 235. Note that the meta floor is idle at this point, meaning that Group A is not privy to the conversation that the Group B Moderator has with Group B. Following this, the PoC Client Group B Moderator 202 releases the floor at 236 after which the floor becomes idle as indicated 238.

Continuing on FIG. 9B, at 240, PoC Client Group B Moderator 202 sends a Floor Request Meta Group message to the PoC Server 204 in response to which a Floor Grant Meta Group 242 is sent from the PoC Server 204 to the PoC Client Group B Moderator 202. At this point, the floor is taken as indicated at 246. At this point, Moderator B has requested the floor and in turn is capable of talking to the both Group A and Group B, for example to indicate to the entire group that the debate has started. Both groups are online at this point. After this, the PoC Client Group B Moderator 202 releases the floor as indicated at 248 after which the floor is idle as indicated by Floor Idle Meta Group 250. At this point, the overall floor belongs to the member of the moderator's group that holds the Meta Group Floor. As indicated previously, RTCP can arbitrate the Meta Floor per standard PoC specifications.

It is next assumed that Group A user "JOE" requests the floor as indicated at 252. This request is forwarded by the PoC Server 204 to the PoC Client Group A Moderator 200 as indicated at 254 as a new message, "Floor Moderation request". In response to this, PoC Client Group A Moderator requests the Floor at 256, is granted the floor at 258 after which a floor taken indication at 260 is generated by the PoC Server 204. Then, PoC Client Group A Moderator 200 sends a Floor Moderation response (with an embedded "Floor Grant" message) 262 to the PoC Server 204 which results in Floor Grant 264 being sent by the PoC server to user "JOE" to give "JOE" the floor. Then, as indicated at 265, Group A user "JOE" is in a position to speak to the all member of Group A and Group B. Sometime later, Group A user "FRED" requests the Floor as indicated at 266. However for the sake of example, it is assumed that user "FRED" has only "listen only" privileges with the GLMS, and as such a Floor Deny message 268 is generated by the PoC Server 204 in response to the request 266 without any interaction with the Group A moderator required.

Sometime later, Group B user "GABBY" requests the floor as indicated at 270. A Floor Moderation request 272 is forwarded by the PoC Server 204 to the PoC Client Group B Moderator 202. In response to this, for the sake of example, it is assumed that PoC Client Group B Moderator 202 generates a Floor Moderation response (with an embedded "Floor Deny" message) 274 which denies "GABBY" the floor. In response to this, the PoC Server 204 Floor Deny message 276 to Group B user "GABBY".

Continuing in FIG. 9C, sometime later, Group B user "MARY" requests the floor as indicated at 278. The PoC Server 204 forwards the Floor Moderation request to PoC Client Group B Moderator 202 as indicated at 280. PoC Client Group B Moderator 202 sends a Floor Request Meta Group message 282 to the PoC Server 204 to request the floor.

In this particular example, the implied implementation is that of ordered queuing in the Meta Group, since the request is automatically serviced at a later time via a "Meta Group" 288. In another embodiment, Meta Group Moderation is provided. Alternatively, there may be no ordering whatsoever for Meta Floor Grants meaning that Meta Floor Grants are allowed only during Meta Floor Idle periods.

When user "JOE" of Group A finishes as indicated by Floor Release 284, PoC Client Group A Moderator 200 also sends a Floor Release Meta Group 286 to clear the Floor for the next group to access the floor. In another embodiment, the "Floor Release Meta Group" may automatically be sent by the PoC server, rather than involving the Group moderator. A floor Grant Meta Group message 288 is generated by the PoC Server 204 and sent to PoC Client Group B Moderator 202, since a queued request is outstanding from the Floor Request Meta Group 282. The Floor is then taken as indicated at 290. At this point, PoC Client Group B Moderator 202 generates a Floor Moderation response (with an imbedded "Floor Grant" message) 292 which is sent to the PoC Server 204. In response to this, the PoC Server 204 generates Floor Grant message 294 which is sent to Group B user "MARY" who is now in position to access the floor as indicated at 295.

Sometime later, Group A user "ALEX" requests the floor as indicated at 296. This is forwarded as a Floor Moderation request to PoC Client Group A Moderator 200. At 300, PoC Client Group A Moderator 200 generates an alert 300 to PoC Client Group B Moderator 202 in order to alert Moderator B that he wants the Meta floor. These Alerts may for example be implemented via the PoC server (not explicitly shown in FIG. 9C). Alternatively, a timer may be implemented in order to cause an automatic revocation of the Floor from Group B at some point. Alternatively a designated Meta Moderator may cause a Revoke to user 'MARY'. In response to this PoC Client Group B Moderator 202 sends a Floor Moderation response (with an imbedded "Floor Revoke" message) 302 to the PoC Server 204 to revoke user "MARY". This is forwarded as Floor Revoke message 304 to Group B user "MARY". After this, PoC Client Group B Moderator 202 sends a Floor release Meta Group message 306 to release the floor. PoC Client Group A Moderator then sends a Floor request Meta Group message 308 to the PoC Server 204 in response to which the floor is granted as indicated at 310. A floor taken message is generated at 312 sent to PoC Client Group B Moderator. Then, Floor Moderation response (with an imbedded "Floor Grant" message) 314 is generated by the PoC Client Group A Moderator to grant the floor to user "ALEX". In response to this, PoC Server 204 sends a Floor Grant message 316 to user "ALEX". At 317, Group A user "ALEX" is now in a position to occupy the floor.

The above-introduced embodiments provide systems and methods for "ordered talk" and "moderated talk". In further embodiments, systems and methods of "ruled talk" are provided to support customs and rules for more structured talk, for example to conduct business.

In ruled talk, the notions of "order" and "moderation" are integrated within a set of "rules of order" for a PTT like session. When the "rules of order" are active, they qualify all communications within the session as being part of one of several possible motions. The motions are codified within tables that ascribe a ranking of priority of the motions with respect to one another so that no motion can be made out of order. Furthermore, participants can assume roles that impose on them further rights and obligations as a result of one or more motions. A table keeps track of the role assigned to each participant. For example, a nomination motion may ultimately result in a particular participant gaining the "chairman" role and the rights and obligations associated with that role, while another participant may gain the "secretary" role in a like fashion. All of these features combine to enable a PTT session to provide an assembly of participants. Example assemblies include shareholders meetings, meetings of board of directors, meetings of committees.

The "ruled talk" features can be used to turn ad-hoc sessions into well-structured assemblies. For example, a group PTT session might start off as an informal discussion. However, if one participant chooses to impose rules of order, a default set of rules is provided and the ad-hoc participants can be enabled to alter the default rules, for example to reflect a desire of the members of the assembly to form a society. Similarly, from within "ruled talk" assemblies, it is envisaged that informal discussions can be created, or "ruled talk" subassemblies or committees can be created with finite yet definite purposes, such as the preparation of a report.

Operationally, one or more tables can be used to hold the "rules of order". In one embodiment, an ORDER of PRECEDENCE of MOTIONS table (OPM) and a RULES RELATING to MOTIONS (RRM) table hold the "rules of order". The OPM and RRM tables define an initial set of motions and rules. The OPM and RRM tables can themselves be altered via motions, such as a motion to adopt "rules of order".

Thus, although one exemplary set of OPM and RRM tables is provided within this application, it is contemplated that through usage these tables will be modified to suit the particular needs of a specific group of participants during one or more sessions.

The exemplary OPM and RRM table is adapted from Robert's Rules of Order, originally copyright 1915, and published in various forms.

The following RRO are adapted from http://www.constitution.org/rror/rror--00.htm Example Robert's Rules of Order (RRO) ORDER of PRECEDENCE of MOTIONS (OPM) Table:

| 1 | 2 | 3 | 4 | 5 | Motion |
|---|---|---|---|---|---|
| — | X | a | X | — | Fix the Time to which to Adjourn. |
| — | X | b | — | — | Adjourn. |
| — | X | c | X | — | Take a Recess. |
| — | X | — | — | — | Raise a Question of Privilege. |
| — | X | — | — | — | Call for the Orders of the Day. |
| — | — | — | — | — | Lay on the Table. |
| — | — | — | — | X | Previous Question. |
| — | — | — | — | X | Limit or Extend Limits of Debate. |
| X | — | — | X | — | Postpone to a Certain Time. |
| X | — | — | X | — | Commit or Refer. |
| X | — | — | X | — | Amend. |
| X | — | — | — | — | Postpone Indefinitely. |
| X | — | — | X | — | A Main Motion. |

Example Legend for RRO OPM Columns:
1 - Debatable
2 - Usually Privileged
3 - Not always privileged:
a - Privileged only when made while another question is pending, and in an assembly that has made no provision for another meeting on the same or the next day.
b - Loses its privileged character and is a main motion if in any way qualified, or if its effect, if adopted, is to dissolve the assembly without any provision for its meeting again.
c - Privileged only when made while other business is pending.
4 - Can be amended
5 - Require a ⅔ vote for their adoption; the others require only a majority.
Motion - brief description of the motion Example RULES RELATING to MOTIONS (RRM) Table:

| 1 | 2 | 3 | 4 | 5 | 6 | 7 | 8 | N | Motion |
|---|---|---|---|---|---|---|---|---|---|
| * | — | * | * | * | — | — | — | 1 | Adjourn (when privileged) |
| — | — | — | — | — | — | — | — | — | Adopt (Accept or Agree to) a Report |
| — | — | — | 2 | — | — | — | — | — | Adopt Constitutions, By-laws, Rules of Order |
| — | — | — | — | — | — | — | — | — | Adopt Standing Rules |
| 4 | — | — | — | — | — | — | — | 3 | Amend |
| 4 | — | * | — | — | — | — | — | — | Amend an Amendment |
| — | — | — | 2 | 5 | — | — | — | — | Amend Constitutions, By-laws, Rules of Order |
| — | — | — | — | — | 6 | — | — | — | Amend Standing Rules |
| * | — | * | — | — | — | — | * | 7 | Appeal, relating to Indecorum, etc. |
| — | — | * | — | — | — | — | * | — | Appeal, all other cases |
| — | — | * | — | — | — | * | — | — | Blanks, Filling |
| — | — | — | — | 8 | — | — | — | — | Commit or Refer, or Recommit |
| * | — | — | — | — | * | — | — | 9 | Debate, to Close, Limit, or Extend |
| * | — | * | * | * | — | * | * | — | Division of the Assembly |
| * | — | — | — | * | — | 10 | 10 | — | Division of the Question |
| 11 | — | — | — | — | — | — | — | 1 | Fix the Time to which to Adjourn |
| — | — | * | — | 2 | — | — | — | — | Informal Consideration of a Question |
| * | — | * | * | * | — | — | — | — | Lay on the Table |
| — | — | * | * | — | — | — | — | — | Leave to Continue Speaking after Indecorum |
| — | — | — | — | — | — | — | — | — | Main Motion or Question |
| — | — | * | — | * | — | * | — | — | Nominations, to Make |
| * | — | — | — | * | * | — | — | — | Nominations, to Close |
| * | — | — | — | 2 | — | — | — | — | Nominations, to Reopen |

| 1 | 2 | 3 | 4 | 5 | 6 | 7 | 8 | N | Motion |
|---|---|---|---|---|---|---|---|---|---|
| * | — | * | * | 2 | 12 | * | * | — | Objection to Consideration of a Question |
| * | — | * | * | * | — | * | * | — | Order, Questions of |
| — | — | — | — | — | * | — | — | — | Order, to Make a Special |
| * | — | * | * | * | — | * | * | — | Orders of the Day, to Call for |
| — | — | — | — | — | — | — | — | — | Order of the Day, when pending |
| * | — | * | * | * | — | * | * | — | Parliamentary Inquiry |
| — | — | — | — | — | — | — | — | — | Postpone Definitely, or to a Certain Time |
| — | * | * | — | 13 | — | — | — | — | Postpone Indefinitely |
| * | — | * | * | 15 | * | — | — | 14 | Previous Question |
| * | — | * | * | * | — | * | * | — | Privilege, to Raise Questions of |
| — | — | — | — | — | — | — | — | — | Privilege, Questions of, when pending |
| * | — | * | * | — | — | — | — | — | Reading Papers |
| 11 | — | — | — | * | — | — | — | 1 | Recess, to Take a (when privileged) |
| 4 | 17 | * | — | * | — | — | * | 16 | Reconsider |
| — | * | — | — | 2 | 18 | — | — | — | Rescind or Repeal |
| — | — | — | — | — | — | — | — | — | Substitute (same as Amend) |
| * | — | * | * | * | * | — | — | — | Suspend the Rules |
| * | — | * | * | * | — | — | — | — | Take from the Table |
| * | — | * | * | * | * | — | — | — | Take up a Question out of its Proper Order |
| * | — | — | — | — | — | — | — | — | Voting, Motions relating to |
| * | — | * | * | 2 | — | * | — | — | Withdraw a Motion, Leave to |

Example Legend for RRO RRM Columns:
1 - Debatable
2 - Debate Confined to Pending Questions
3 - Can be Amended
4 - Subsidiary Motions can be Applied
5 - Can be Reconsidered
6 - Requires only a Majority Vote
7 - Must be Seconded
8 - Out of Order when Another has Floor
N - Note below
Motion - brief description of the motion The rules at the head of the 8 columns apply to all original main motions, and to all other cases except where a star (*) or a figure indicates that the motion is an exception to these rules. The star shows that the exact opposite of the rule at the head of the column applies to the motion, and a figure refers to a note which explains the extent of the exception. For example, "Lay on the Table"; the Table shows that it is "undebatable" and "cannot be amended"; that "no subsidiary motion can be applied" to it; and that it "cannot be reconsidered"; - - - the fact that the 4 other columns have no stars or figures shows that the rules at the head of these columns apply to this motion, to Lay on the Table, the same as to original main motions.

Notes to RRO RRM Table
1. To Fix the Time to which to Adjourn is privileged only when made while another question is pending, and in an assembly that has made no provision for another meeting on the same or the next day. To Adjourn loses its privileged character and is a main motion if in any way qualified, or if its effect, if adopted, is to dissolve the assembly without any provision for its meeting again. To Take a Recess is privileged only when made while other business is pending.
2. An affirmative vote on this motion cannot be reconsidered.
3. An Amendment may be made (a) by inserting (or adding) words or paragraphs; (b) by striking out words or paragraphs; (c) by striking out certain words and inserting others; or (d) by substituting one or more paragraphs for others, or an entire resolution for another, on the same subject.
4. Undebatable when the motion to be amended or reconsidered is undebatable.
5. Constitutions, By-Laws, and Rules of Order before adoption are in every respect main motions and may be amended by majority vote. After adoption they require previous notice and ⅔ vote for amendment.
6. Standing Rules may be amended at any time by a majority vote if previous notice has been given, or by a ⅔ vote without notice.
7. An Appeal is undebatable only when made while an undebatable question is pending, or when relating to indecorum, or to transgressions of the rules of speaking, or to the priority of business. When debatable, only one speech from each member is permitted. On a tie vote the decision of the chair is sustained.
8. Cannot be reconsidered after the committee has taken up the subject, but by ⅔ vote the committee at any time may be discharged from further consideration of the question.
9. These motions may be moved whenever the immediately pending question is debatable, and they apply only to it, unless otherwise specified.
10. If resolutions or propositions relate to different subjects which are independent of each other, they must be divided on the request of a single member, which can be made when another has the floor. If they relate to the same subject and yet each part can stand alone, they may be divided only on a regular motion and vote.
11. Undebatable if made when another question is before the assembly.

12. The objection can be made only when the question is first introduced, before debate. A ⅔ vote must be opposed to the consideration in order to sustain the objection.
13. A negative vote on this motion cannot be reconsidered.
14. The Previous Question may be moved whenever the immediately pending question is debatable or amendable. The questions upon which it is moved should be specified; if not specified, it applies only to the immediately pending question. If adopted it cuts off debate and at once brings the assembly to a vote on the immediately pending question and such others as are specified in the motion.
15. Cannot be reconsidered after a vote has been taken under it.
16. The motion to reconsider can be made while any other question is before the assembly, and even while another has the floor, or after it has been voted to adjourn, provided the assembly has not been declared adjourned. It can be moved only on the day, or the day after, the vote which it is proposed to reconsider was taken, and by one who voted with the prevailing side. Its consideration cannot interrupt business unless the motion to be reconsidered takes precedence of the immediately pending question. Its rank is the same as that of the motion to be reconsidered, except that it takes precedence of a general order, or of a motion of equal rank with the motion to be reconsidered, provided their consideration has not actually begun.
17. Opens to debate main question when latter is debatable.
18. Rescind is under the same rules as to amend something already adopted. See notes 2, 5, and 6, above.

Additional RRO Rules

Incidental Motions. Motions that are incidental to pending motions take precedence of them and must be acted upon first. See classification below for list of these motions.

No privileged of subsidiary motion can be laid on the table, postponed definitely or indefinitely, or committed. When the main question is laid on the table, etc., all adhering subsidiaries go with it.

Classification of RRO Motions

Incidental Main Motions

Accept or Adopt a Report upon a subject referred to a committee
Adjourn at, or to, a future time
Adjourn, if qualified in any way, or to adjourn when the effect is to dissolve the assembly with no provision for its reconvening
Appoint the Time and Place for the next meeting, if introduced when no business is pending
Amend the Constitution, By-laws, Standing Rules, or Resolutions, etc., already adopted
Ratify or Confirm action taken
Rescind or Repeal action taken Subsidiary Motions Lay on the Table
The Previous Question
Limit or Extend Limits of Debate
Postpone Definitely, or to a Certain Time
Commit or Refer, or Recommit
Amend
Postpone Indefinitely Incidental Motions Questions of Order and Appeal
Suspension of the Rules
Objection to the Consideration of a Question
Division of a Question, and consideration by Paragraph or Seriatim
Division of the Assembly, and Motions relating to Methods of Voting, or to Closing or to Reopening the Polls
Motions relating to Methods of Making, or to Closing or to Reopening Nominations
Requests growing out of Business Pending or that has just been pending; as, a Parliamentary Inquiry, a Request for Information, for Leave to Withdraw a Motion, to Read Papers, to be Excused from a Duty, or for any other Privilege Privileged Motions Fix the Time to which to Adjourn (if made while another question is pending)
Adjourn (if unqualified and if it has not the effect to dissolve the assembly)
Take a Recess (if made when another question is pending)
Raise a Question of Privilege
Call for Orders of the Day Main or Unclassified Motions Take from the Table
Reconsider
Rescind
Renewal of a Motion
Ratify
Dilatory, Absurd, or Frivolous Motions
Call of the House Further detail on Robert's Rules of Order can be obtained by referring directly to any one of many published versions of Robert's Rules of Order. These rules have been described here for the purpose of having a definite example of tables of an OPM table and an RRM table.

In addition to the OPM and RRM table, an optional role table can be used to ascribe roles to participants, as well as to define the RIGHTS that participants may have to MAKE specific MOTIONS (RMM) within a session.

Figure 10:
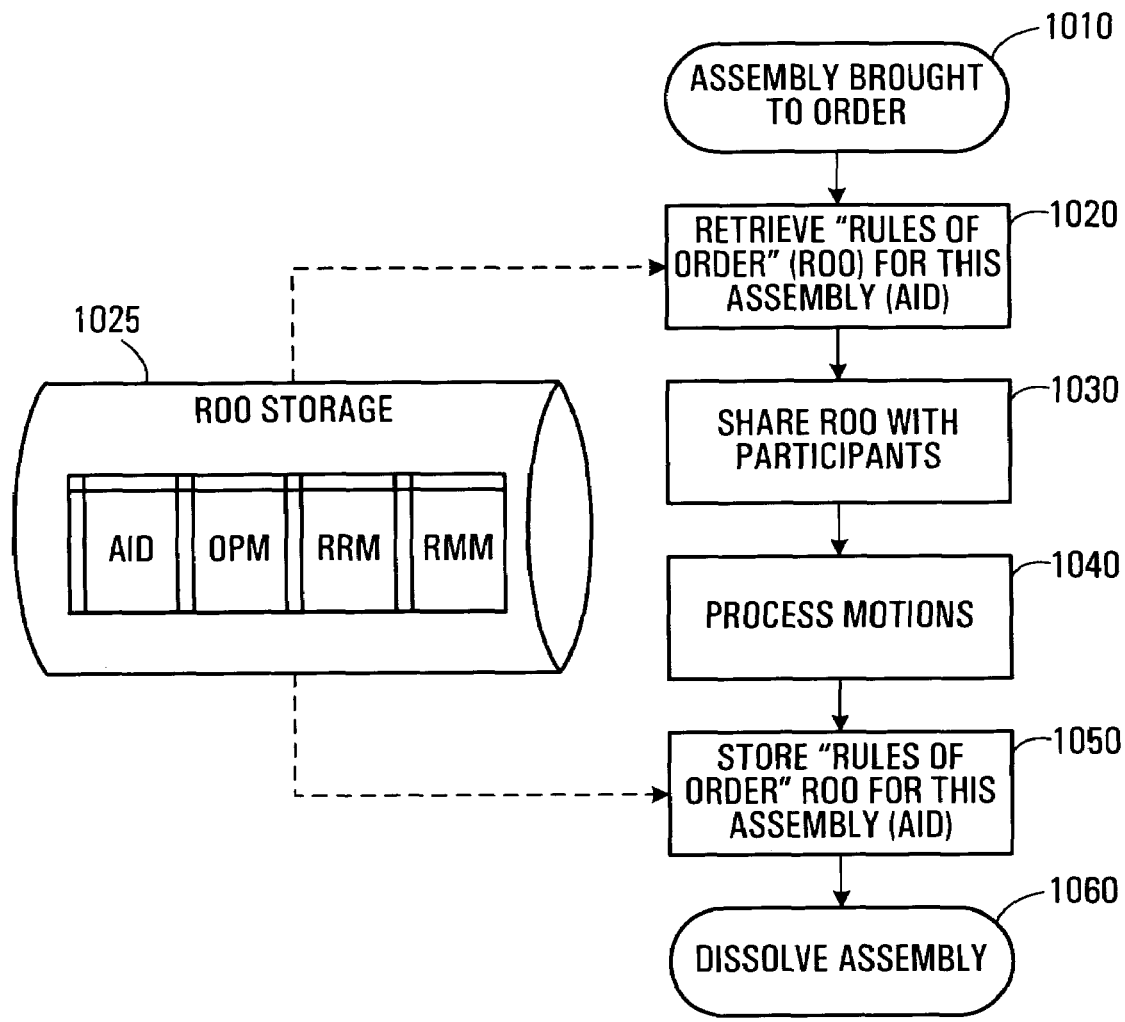
FIG. 10 is a flow chart illustrating an example method of a ruled moderated talk order control according to an embodiment of the application.

Referring now to FIG. 10, there is shown a flow chart with exemplary steps of a method for "ruled talk", a variant of "ordered" and "moderated" talk.

At step 1010, the assembly is brought to order. For example, a user of a mobile device initiates a group PTT like session in which he specifies an assembly identifier or AID.

At step 1020, the rules of order (ROO) are retrieved from a shared ROO storage 1025. At least the moderator retrieves the ROO. In an alternate embodiment all participants retrieve the rules of order at this step.

At step 1030, the rules of order (ROO) are shared with the participants. In an alternate embodiment this step is optional.

At step 1040, motions are processed in accordance with the ROO. Further details of this step are shown in FIG. 11.

At step 1050, the ROO are stored to reflect any changes which resulted from the processing of the motions.

At step 1060, the assembly is dissolved.

Figure 11:
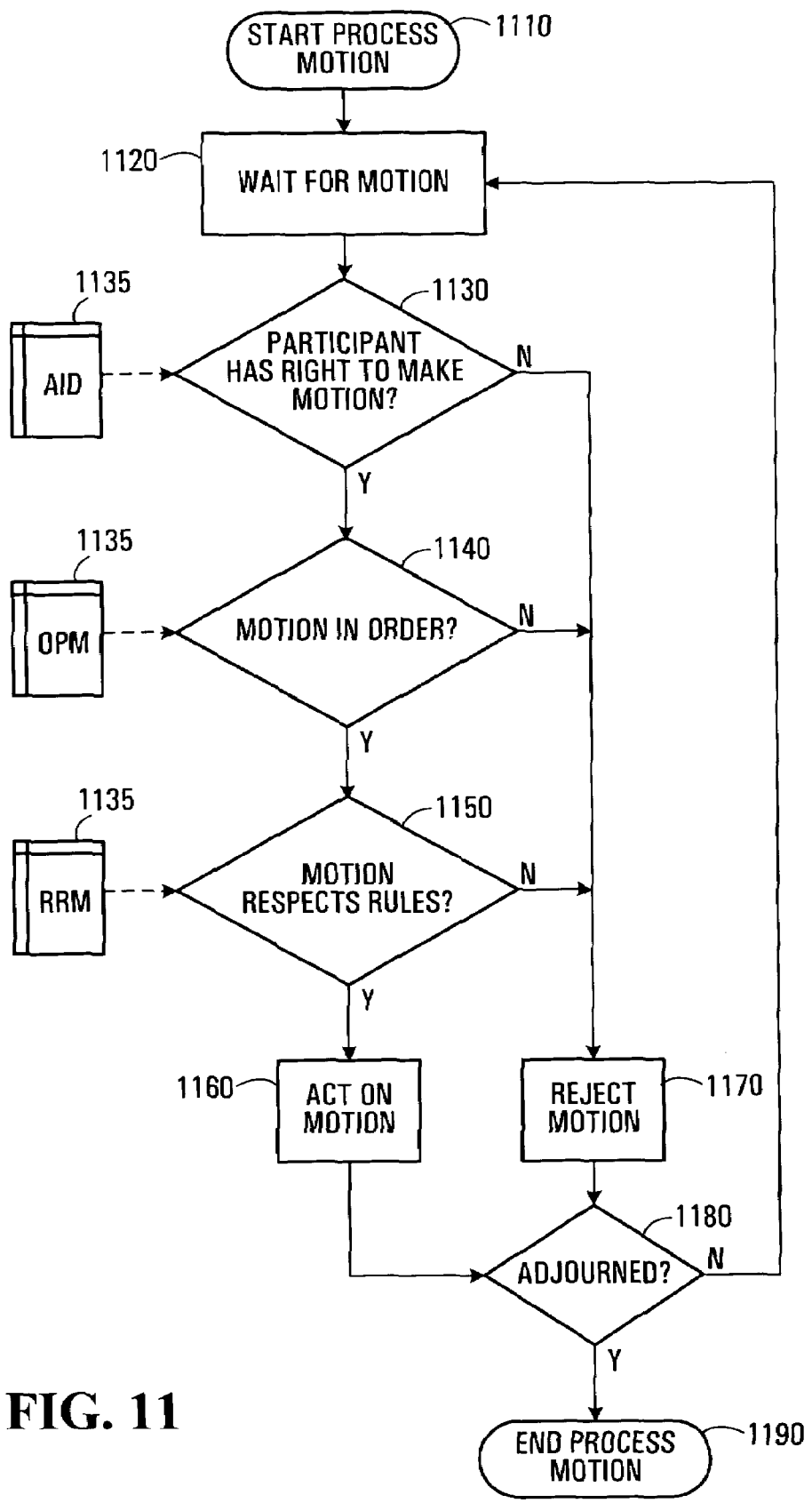
FIG. 11 is a flow chart illustrating an example method of processing motions according to an embodiment of the application.

Referring now to FIG. 11, further details of the motion-processing step of FIG. 10 are shown.

At step 1110, motion-processing begins.

At step 1120, at least one participant, such as the moderator, waits for a motion. The motion can come from other participants in the assembly, or from the moderator. In an alternate embodiment, all participants wait for a motion.

At step 1130, it is determined whether or not the participant who made the motion has a right to make the motion. For example, although many participants may be part of an assembly for a society, only those participants who have paid their dues are enabled to make motions. This is determined by looking up the participant in the Rights to Make Motions (RMM) 1135 table of the ROO, for example.

At step 1140, it is determined whether or not the motion is in order. For example, a motion to Call for the Orders of the Day is out of order if it is after a motion to Take a Recess. This is determined by looking up the motion in the Order of Precedence of Motions (OPM) 1145, for example.

At step 1150, it is determined whether or not the motion respects the rules relating to motions. For example, some motions may be moved whenever the immediately pending question is debatable, and they apply only to it, unless otherwise specified. This is determined by looking up the motion in the Rules Relating to Motions (RRM) 1155, for example.

At step 1160, if the motion has been determined to have been moved by a participant having the right to make the motion, if the motion has been determined to be in order, and if the motion has been determined to respect the rules relating to motions, then and only then is the motion acted upon. Actions are envisaged to include acquiring the talk channel, requesting and performing a vote, sharing a document such as a report for "laying on the table", amending a motion, or any other communication which has as an effect the advancement of the purpose for which the assembly is convened, including the creation of sub-assemblies and committees.

At step 1170, if the motion has been determined to fail in any one of the steps 1140, 1150 or 1160, then it is rejected.

At step 1180, if the motion acted upon on step 1170 was to adjourn, then the method reaches step 1190 and the motion processing ends. For all other motions, the method continues at step 1130 and a new motion is awaited.

It is envisaged that the determining steps of the method can be performed in conjunction with a user interface on the mobile communication devices of participants in the assembly. Preferably, when a participant desires to make a motion, only those motions which he has a right to make, which are in order, and which otherwise respect the rules of order are suggested to the user by the user interface.

In some embodiments, the method, system, and device are adapted to provide peripheral support for wired devices to participate in a wireless call via a network interworking function, so that although the devices are not within the wireless network, they appear as though they are, and are able to participate therein. Hence, according to this embodiment, not all or necessarily any of the devices in a PTT™ group are wireless, and transmit channel messaging occurs in an analogous manner to that described hereinabove in PTT™ groups where one or more of the devices is a stationary or otherwise non-wireless wired device. Hence, a wireless PTT™ session may have wired or landline based devices participating in the PTT™ session in accordance with the embodiments, adapted to transmit and receive messages for transmit channel request messaging.

Numerous modifications and are possible in light of the above teachings. It is therefore to be understood that within the scope of the appended claims, the application may be practiced otherwise than as specifically described herein.

We claim:

1. In a system adapted to deliver walkie-talkie-like communications capabilities within a talk group of wireless devices such that within the group, a single wireless device is given transmit capability while all other devices have a receive capability, a method for a moderator wireless device having a user interface which includes a display and a talk button for participation in group talk sessions in a wireless network, the moderator wireless device being adapted to perform talk order control of a group talk session by:

receiving, at the moderator wireless device via the wireless network, on an ongoing basis during the group talk session, requests for the transmit capability from the wireless devices which are relayed by a message controller via the wireless network;

displaying, in the display, a list of identifiers of the wireless devices that have transmitted the requests for the transmit capability;

maintaining, on an ongoing basis during the group talk session, a record of the received requests that are outstanding; and granting, from the moderator wireless device via the wireless network, requests for the transmit capability based on the record of the received requests that are outstanding.

2. The method of claim 1 wherein the record of the received requests that are outstanding comprises a list of requests that are outstanding arranged in an order they were received, and wherein the requests for transmit capability are granted from oldest to newest.

3. The method of claim 1 wherein the moderator wireless device is further adapted to detect or receive an indication that the transmit capability has been given up, and responsive to the transmit capability having been given up transmit a clear to talk message to a device next to be granted the transmit capability.

4. The method of claim 1 wherein the moderator wireless device is further adapted to receive a request from a device to request that the device no longer be considered waiting for the transmit capability.

5. The method of claim 1 wherein messages are transmitted associated with the talk group, the messages comprising at least one of:

release of talk message from device to network;

clear to talk message from network to device;

interrupt message from network to device; and mute order from network to wireless device.

6. The method of claim 1, wherein the moderator wireless device is further adapted to count a number of requests received from each device and re-prioritize granting the transmit privilege on the basis of the number of requests received from each device.

7. The method of claim 1 wherein each request comprises a transmit channel request message.

8. The method of claim 1 wherein the moderator wireless device is further adapted to grant each request by causing a clear-to-talk message for the device to be sent via the network.

9. The method of claim 8 wherein the group talk session comprises a Push-to-talk-over Cellular (PoC) session.

10. The method of claim 9 wherein the message controller is adapted to, for each group:
- maintain a designation of the particular device to be the moderator wireless device for the group;
- receive requests for the transmit capability and forward the requests to the moderator wireless device; and
- receive, from the moderator wireless device, the grants of the transmit capability and forward each grant at least to a respective grantee device.

11. The method of claim 10 further adapted to:
maintain privilege information for each of the talk group of devices; and
receive talk group control messages from the wireless devices and process the messages in accordance with the privilege information.

12. The method of claim 11 wherein the privilege information comprises an indication of whether at least one of the following privileges is accorded a given wireless device:
- moderator capability;
- moderator meta-group capability;
- private messaging within group;
- broadcast messaging;
- talk channel request access;
- listen-only access.

13. The method of claim 9 wherein the moderator wireless device is adapted to receive, via the network, requests from other devices for the transmit capability;
- the moderator wireless device has a user interface for receiving a user selection of a device from which a request for transmit capability has been received to be selected and granted the transmit capability; and
- responsive to said user selection, the moderator wireless device being adapted to transmit a message granting the transmit capability to the device via the network.

14. The method of claim 11 wherein the moderator wireless device is further adapted to:
- maintain a set of rules of order for the talk group; and
- allow interaction between the talk group in accordance with the rules of order.

15. The method of claim 14 wherein the rules of order comprise:
- rights to make motions;
- order of precedence of motion; and
- rules respecting motions.

16. The method of claim 1 implemented using one of CDMA-based communications, 802.11-based communications, iDEN, GPRS, Bluetooth, UMTS, PoC (push to talk over cellular).

17. The method of claim 1 wherein the messages are transmitted using DTMF signals.

18. A method for a moderator wireless device adapted to moderate a network-delivered walkie-talkie-like communications session between a plurality of wireless devices via a wireless network, the moderator wireless device having a user interface which includes a display and a talk button for participation in communication sessions in the wireless network, the method comprising:
- granting, by the moderator wireless device via the wireless network for the communications session, a transmit capability to one of the wireless devices and a listen privilege to remaining wireless devices;
- receiving, at the moderator wireless device via the wireless network, transmit channel request messages for the transmit capability from wireless devices having the listen privilege;
- displaying, in the display, a list of identifiers of the wireless devices that have transmitted the transmit channel request messages; and
- granting, by the moderator wireless device, the transmit capability to one of the wireless devices based on the requests for the transmit capability by sending, via the wireless network, a clear-to-talk message for the wireless device.

19. The method of claim 18 wherein granting the transmit capability based on the requests for the transmit capability is done in the order the requests are received.

20. The method of claim 18 further comprising:
repeating the acts of receiving and granting during the communications session.

21. The method of claim 18 wherein granting the transmit capability based on the transmit capability is done in accordance with a defined set of rules of order in the moderator wireless device.

22. A computer readable medium having processor executable instructions stored thereon for implementing a method according to claim 18.

23. A computer readable medium having processor executable instructions stored thereon for implementing a method according to claim 19.

24. A computer readable medium having processor executable instructions stored thereon for implementing a method according to claim 20.

25. A computer readable medium having processor executable instructions stored thereon for implementing a method according to claim 21.

26. A wireless communication device adapted to moderate a network delivered walkie-talkie-like communications session between a plurality of wireless devices via a wireless network, the wireless communication device comprising:
- a processing element;
- a user interface which includes a display and a talk button for participation in communication sessions in the wireless network;
- a message reception element coupled to the processing element and adapted to receive messages via the wireless network;
- a message transmission element coupled to the processing element and adapted to transmit messages via the wireless network;
- the processing element being operative to:
  - grant, via the message transmission element for the communications session, a transmit capability to one of the wireless devices and a listen privilege to remaining wireless devices;
  - receive, via the message reception element, transmit channel request messages for the transmit capability from wireless devices having the listen privilege;
  - displaying in the display, a list of identifiers of the wireless devices that have transmitted the requests for the transmit capability; and
  - grant the transmit capability to one of the wireless devices based on the requests for the transmit capability by sending, via the message transmission element, a clear-to-talk message for the wireless device.

27. The wireless communication device of claim 26 wherein the processing element is operative to grant the transmit capability based on the order in which the requests are received.

28. The wireless communication device of claim 26 wherein the processing element is operative to grant the transmit capability in accordance with a defined set of rules of order.

29. The wireless communication device of claim 26, wherein the processing element is further operative to:

repeat the receiving and granting during the communications session.

* * * * *

UNITED STATES PATENT AND TRADEMARK OFFICE
CERTIFICATE OF CORRECTION

PATENT NO. : 7,623,882 B2  Page 1 of 1
APPLICATION NO. : 10/941985
DATED : November 24, 2009
INVENTOR(S) : Plestid et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Twenty-sixth Day of October, 2010

David J. Kappos
*Director of the United States Patent and Trademark Office*